(12) United States Patent
Lee et al.

(10) Patent No.: US 9,799,212 B2
(45) Date of Patent: Oct. 24, 2017

(54) TERMINAL, NETWORK SYSTEM AND CONTROLLING METHOD THEREOF

(71) Applicant: LG ELECTRONICS INC., Seoul (KR)

(72) Inventors: Minho Lee, Seoul (KR); Youngyeon Seo, Seoul (KR); Hyukjae Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/994,929

(22) Filed: Jan. 13, 2016

(65) Prior Publication Data
US 2016/0358460 A1 Dec. 8, 2016

(30) Foreign Application Priority Data

Jun. 3, 2015 (KR) ........................ 10-2015-0078379

(51) Int. Cl.
*G08C 17/02* (2006.01)
*H04M 1/725* (2006.01)

(52) U.S. Cl.
CPC .......... *G08C 17/02* (2013.01); *H04M 1/7253* (2013.01); *G08C 2201/92* (2013.01); *H04M 2250/74* (2013.01)

(58) Field of Classification Search
CPC ............................ G08C 17/02; G08C 2201/92
USPC ....................................... 340/12.5
See application file for complete search history.

(56) References Cited

U.S. PATENT DOCUMENTS

| | | | | |
|---|---|---|---|---|
| 2005/0021876 A1* | 1/2005 | Asai | ........................... | G06F 9/50 710/1 |
| 2009/0254351 A1* | 10/2009 | Shin | ......................... | G06F 3/167 704/275 |
| 2010/0105364 A1* | 4/2010 | Yang | ................. | G06F 17/30663 455/414.1 |
| 2011/0018754 A1* | 1/2011 | Tojima | .................... | G08C 17/00 341/176 |
| 2011/0201363 A1* | 8/2011 | Shim | ........................ | H04L 67/30 455/466 |
| 2011/0279223 A1* | 11/2011 | Hatambeiki | ........... | G06F 3/0346 340/4.3 |

(Continued)

OTHER PUBLICATIONS

European Patent Office Application No. 16000385.1, Search Report dated Nov. 2, 2016, 7 pages.

*Primary Examiner* — George Bugg
*Assistant Examiner* — Thang Tran
(74) *Attorney, Agent, or Firm* — Lee, Hong, Degerman, Kang & Waimey

(57) ABSTRACT

A terminal device, network system and controlling method thereof are provided. The present invention includes an input unit configured to receive an input of a command, a controller recognizing the inputted command and detecting state information, and a communication unit transmitting the detected state information by broadcasting and receiving state information of an external device from the external device by the broadcasting, the controller comparing the detected state information to the received state information of the external device such that if a priority of the detected state information is high, the controller executes the recognized command, and if the priority of the detected state information is low, the controller does not execute the recognized command.

20 Claims, 22 Drawing Sheets

(56) References Cited

U.S. PATENT DOCUMENTS

| | | | |
|---|---|---|---|
| 2013/0072251 A1* | 3/2013 | Kim | H04M 1/7253 |
| | | | 455/550.1 |
| 2013/0073293 A1 | 3/2013 | Jang et al. | |
| 2013/0166785 A1 | 6/2013 | Lee et al. | |
| 2013/0249679 A1* | 9/2013 | Arling | G08C 19/00 |
| | | | 340/12.22 |
| 2013/0300546 A1* | 11/2013 | Kim | G08C 19/00 |
| | | | 340/12.22 |
| 2014/0075102 A1* | 3/2014 | Oh | G06F 12/0246 |
| | | | 711/103 |
| 2015/0044998 A1* | 2/2015 | Roh | H04L 63/0428 |
| | | | 455/411 |
| 2015/0067528 A1* | 3/2015 | Yoshida | G08C 17/02 |
| | | | 715/740 |
| 2015/0113262 A1* | 4/2015 | Kamal | A61B 5/7275 |
| | | | 713/100 |
| 2015/0128065 A1* | 5/2015 | Torii | G06F 3/1454 |
| | | | 715/746 |
| 2015/0201065 A1* | 7/2015 | Shim | H04M 1/72569 |
| | | | 455/556.1 |
| 2015/0341419 A1* | 11/2015 | Lin | H04L 67/06 |
| | | | 715/748 |
| 2016/0088348 A1* | 3/2016 | Dhanabalan | H04N 5/765 |
| | | | 725/28 |

\* cited by examiner

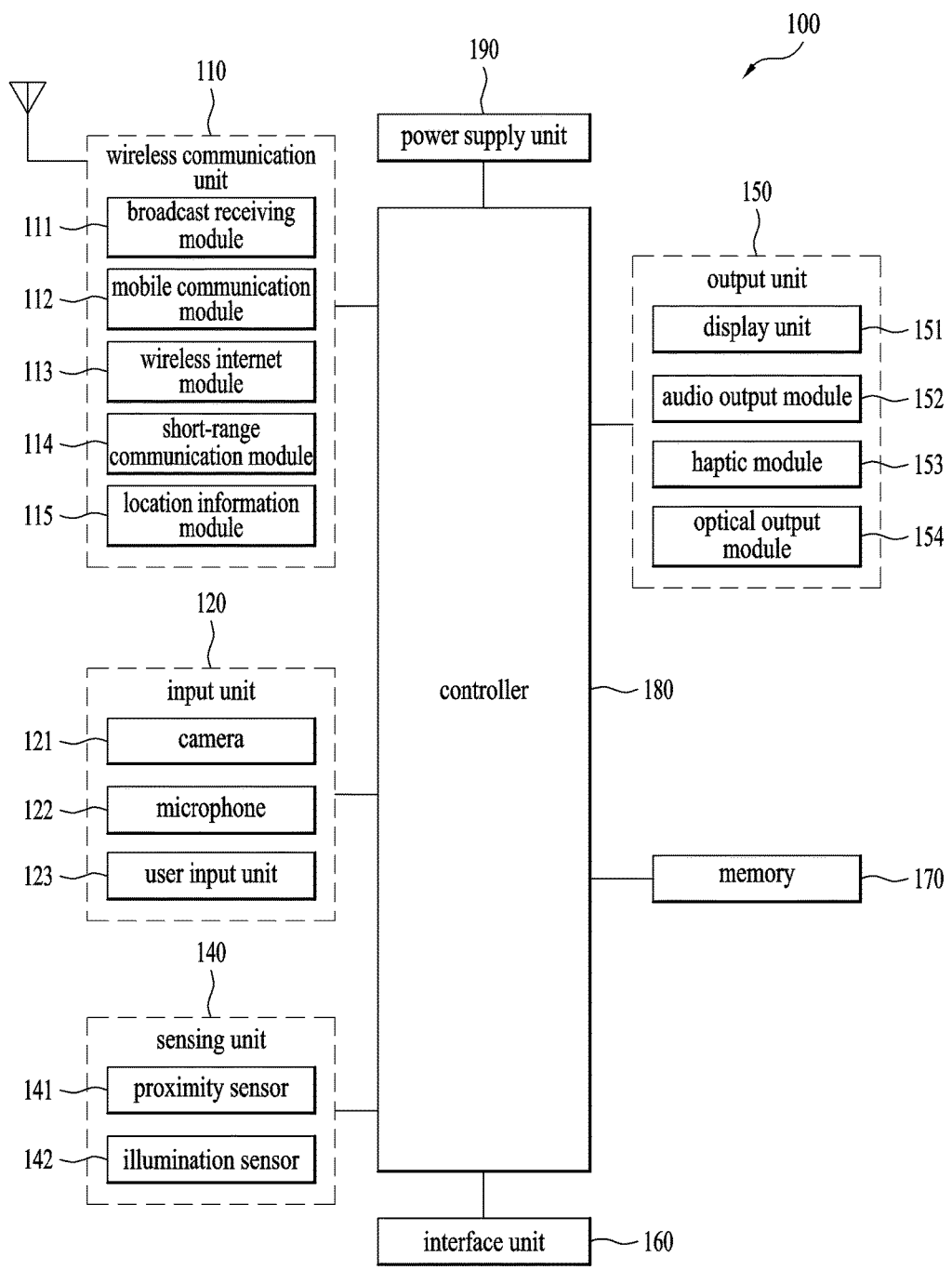

FIG. 10

| Source IP Address |
| --- |
| Command Data |
| Command Priority |
| time |
| Flag |
| Distance (to User) |
| Option |

FIG. 11

| Terminal device | Command | Command priority |
| --- | --- | --- |
| TV | Play a movie | A |
| | Play music | B |
| | Start cleaning | X (corresponding command not exist) |
| | Call to AAA | X (corresponding command not exist) |
| Mobile phone | Play a movie | B |
| | Play music | B |
| | Start cleaning | X (corresponding command not exist) |
| | Call to AAA | A |
| Tablet | Play a movie | B |
| | Play music | B |
| | Start cleaning | X (corresponding command not exist) |
| | Call to AAA | B |
| Cleaner | Play a movie | X (corresponding command not exist) |
| | Play music | X (corresponding command not exist) |
| | Start cleaning | A |
| | Call to AAA | X (corresponding command not exist) |

FIG. 16

| Command | Associated command set list |
|---|---|
| Play a movie | Movie information search |
|  | Remote controller execution |
| Turn on TV channel | TV schedule table search |
|  | Remote controller execution |
| Let me know fried chicken stew recipe | Check whether fried chicken stew material list is retained |
|  | Order required material |
| Search for today's weather | Dehumidifier execution |
|  | Humidifier execution |
|  | Air cleaner execution |

FIG. 23A
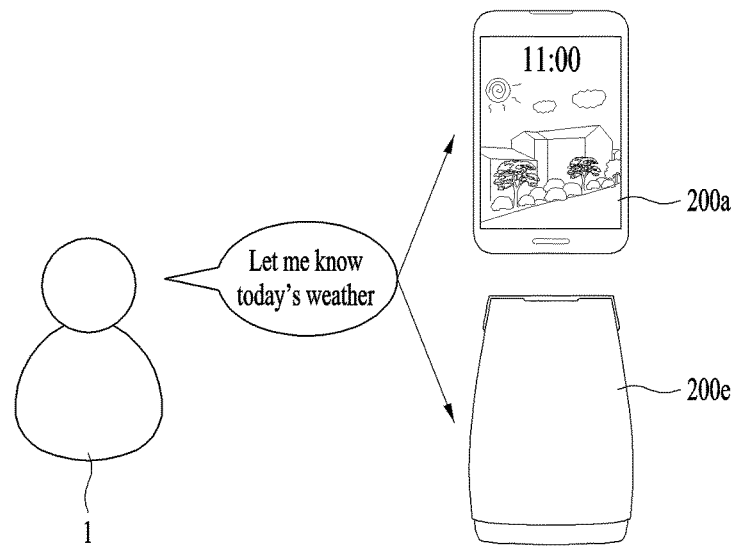
FIG. 23B
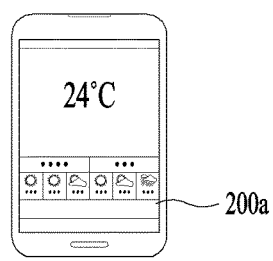
FIG. 23C
| Trigger Condition | Execution command |
|---|---|
| Snow/rain | Dehumidifier execution |
| Fine dust | Air cleaner execution |
| Dry | Humidifier execution |

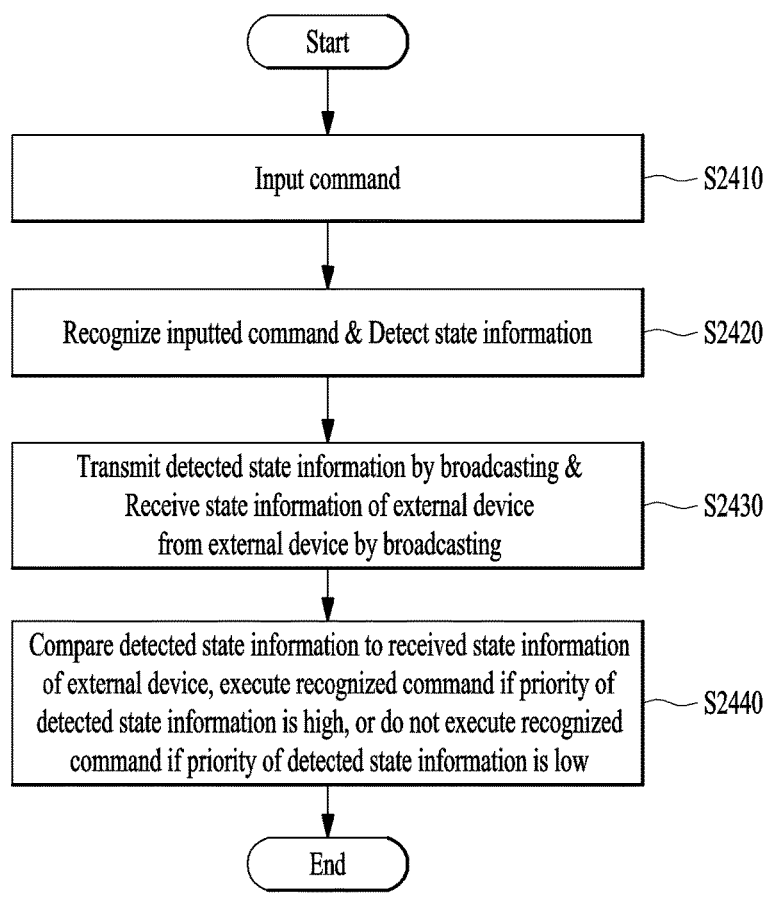

TERMINAL, NETWORK SYSTEM AND CONTROLLING METHOD THEREOF

Pursuant to 35 U.S.C. §119(a), this application claims the benefit of earlier filing date and right of priority to Korean Application No. 10-2015-0078379, filed on Jun. 3, 2015, the contents of which is hereby incorporated by reference herein in its entirety.

FIELD OF THE INVENTION

The present invention relates to a terminal device, and more particularly, to a terminal device, network system including the terminal device and controlling method thereof.

DISCUSSION OF THE RELATED ART

Generally, terminals can be classified into mobile/portable terminals and stationary terminals. In particular, the mobile terminals can be further classified into handheld terminals and vehicle mounted terminals according to possibility of user's direct portability.

Recently, functions of a mobile terminal tend to be diversified. For instance, the diversified functions include a function of data and audio communication, a function of photographing and recording a video through a camera, a function of audio recording, a function of music file play through a speaker system, a function of outputting image or video through a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example.

To support and increase the terminal functions, improvement of structural parts and/or software parts of the terminal may be considered.

Meanwhile, a user possesses various kinds of terminals or terminal devices. For instance, a user may possess a personal mobile terminal device such as a smartphone, a tablet PC and the like and a shared terminal device such as a TV and the like. As a user possesses various kinds of terminal devices, it may be inconvenient or cumbersome for the user to input a command to a specific terminal device. Moreover, if a user inputs a command to all terminal devices simultaneously, the terminal devices can launch functions simultaneously as well, thereby possibly causing inconvenience to the user. Thus, the demand for a technology capable of enabling an optimal terminal device to execute a command despite that a user inputs a command to all terminal devices simultaneously is increasing.

SUMMARY OF THE INVENTION

Accordingly, embodiments of the present invention are directed to a terminal device, network system including the terminal device and controlling method thereof that substantially obviate one or more problems due to limitations and disadvantages of the related art.

An object of the present invention is to provide a terminal device, network system including the terminal device and controlling method thereof as follows. First of all, state informations are transceived among a plurality of terminal devices. Secondly, if priority is high based on the state information of a terminal device and the received state information of another terminal device, a recognized command is executed.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a terminal device according to one embodiment of the present invention may include an input unit configured to receive an input of a command, a control unit recognizing the inputted command, the control unit detecting state information of a device, and a communication unit configured to transmit the detected state information by broadcasting, the communication unit configured to receive a state information of an external device from the external device by the broadcasting, wherein the control unit compares the detected state information and the received state information of the external device to each other, wherein if a priority of the detected state information is higher, the control unit executes the recognized command, and wherein if the priority of the detected state information is lower, the control unit does not execute the recognized command.

Preferably, the state information may include a command priority data for the recognized command and an input time data of the command.

More preferably, the state information may include at least one of a command recognition flag indicating whether the command is directly input, a distance data indicating a distance from a user, and a weight data indicating an additional weight.

In this case, the control unit may determine the priority of the state information by comparing the command priority data included in the detected state information to the command priority data included in the received state information of the external device.

And, the control unit may determine the priority of the state information by comparing the command priority data resulting from adding the weight data to the command priority data.

Moreover, if the priority of the priority data included in the detected state information is equal to that of the priority data included in the received state information of the external device, the control unit may determine the priority of the state information by comparing the distance data.

If the recognized command includes a command nonexecutable in the terminal device, the communication unit may receive a streaming data related to the recognized command from the external device having the command recognition flag set to F (false) and the control unit may process the received streaming data.

Preferably, when the control unit executes the recognized command based on the priority of the detected state information, if a command set associated with the recognized command exists, the control unit may transmit the associated command set to the external device by the broadcasting.

More preferably, when the control unit does not execute the recognized command based on the priority of the detected state information, the control unit may not receive the associated command set transmitted by the broadcasting and executes a single executable command included in the associated command set.

In another aspect of the present invention, as embodied and broadly described herein, a network system having a plurality of terminal devices according to another embodiment of the present invention may include a 1st terminal device receiving an input of a command, the 1st terminal device recognizing the inputted command, the 1st terminal device detecting a 1st state information, the 1st terminal device transmitting the detected 1st state information by broadcasting and a 2nd terminal device receiving the 1st state information from the 1st terminal device, the 2nd terminal device detecting a 2nd state information, the 2nd terminal device transmitting the 2nd state information by the broadcasting, wherein the 1st terminal device receives the 2nd state information from the 2nd terminal device, wherein the 1st terminal device compares the 1st state information to the 2nd state information, wherein if a priority of the 1st state information is higher, the 1st terminal device executes the recognized command, and wherein if the priority of the 1st state information is lower, the 1st terminal device does not execute the recognized command.

Preferably, each of the 1st state information and the 2nd state information may include a command priority data for the recognized command and an input time data of the command.

More preferably, each of the 1st state information and the 2nd state information may include at least one of a command recognition flag indicating whether the command is directly input, a distance data indicating a distance from a user, and a weight data indicating an additional weight.

In further aspect of the present invention, as embodied and broadly described herein, a method of controlling a terminal device according to further embodiment of the present invention may include receiving an input of a command, recognizing the inputted command, detecting a state information, transmitting the detected state information by broadcasting, receiving a state information of an external device from the external device by the broadcasting, comparing the detected state information and the received state information of the external device to each other, if a priority of the detected state information is higher, executing the recognized command, and if the priority of the detected state information is lower, not executing the recognized command.

Preferably, the state information may include a command priority data for the recognized command and an input time data of the command.

More preferably, the state information may include at least one of a command recognition flag indicating whether the command is directly input, a distance data indicating a distance from a user, and a weight data indicating an additional weight.

Accordingly, embodiments of the present invention provide various effects and/or features.

According to at least one of embodiments of the present invention, it is advantageous in that a command may not be executed by designating a specific device.

According to at least one of embodiments of the present invention, it is advantageous in that a single optimal device can be enabled despite inputting a command to a plurality of devices simultaneously.

According to at least one of embodiments of the present invention, it is advantageous in that a command can be executed in a manner of receiving streaming data from a command executable terminal device despite that a device located nearby a user is unable to execute a command.

According to at least one of embodiments of the present invention, it is advantageous in that each of a plurality of terminal devices can execute a command set of an inputted command.

Effects obtainable from the present invention are not limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1A is a diagram to describe a mobile terminal device related to the present invention;

FIG. 10 is a diagram to describe a transmitted data packet according to one embodiment of the present invention;

FIG. 11 is a diagram to describe commands corresponding to a terminal device according to one embodiment of the present invention;

FIG. 16 is a diagram to describe an associated command set according to one embodiment of the present invention;

FIGS. 23A, 23B and 23C are diagrams to describe a 7th embodiment for a plurality of terminal devices to execute a user's command jointly; and FIG. 24 is a flowchart for a method of controlling a terminal device according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
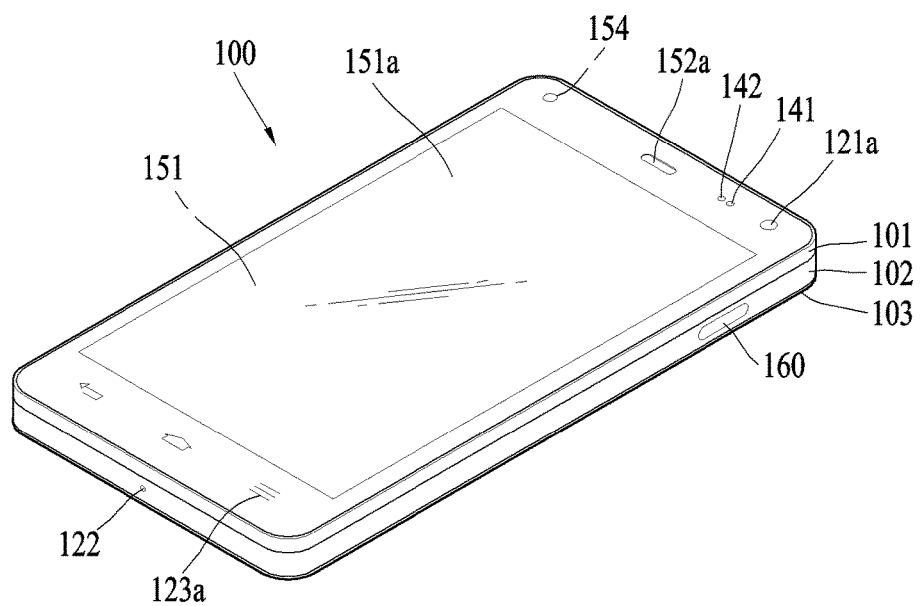
FIGS. 1B and 1C are diagrams for the concept of one example of a mobile terminal device related to the present invention in different views, respectively.
Figure 1C:
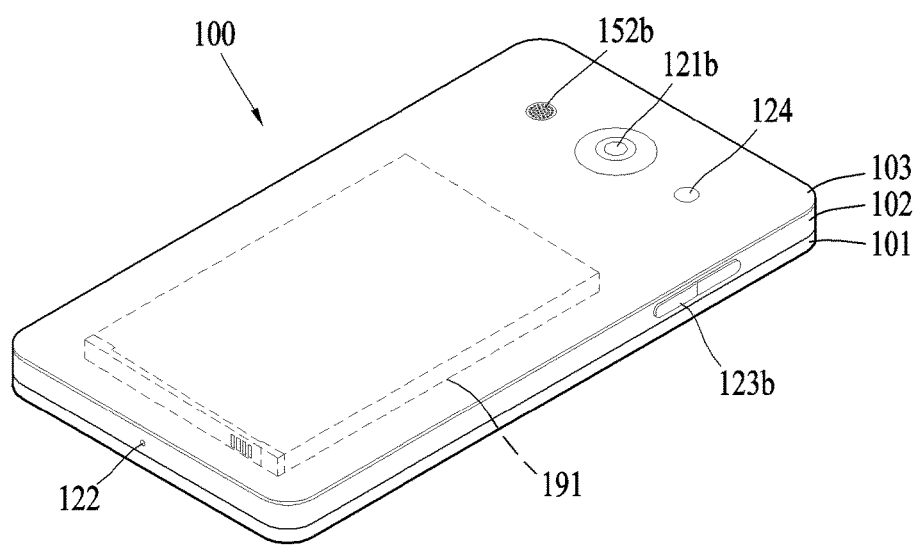

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, a Red/Green/Blue (RGB) sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can process or provide appropriate information or function to a user by processing signals, data, information and the like inputted or outputted through the above-mentioned components or running application programs saved in the memory 170.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the above-mentioned components can cooperatively operate to embody operations, controls or controlling methods of the mobile terminal according to various embodiments mentioned in the following description. And, the operations, controls or controlling methods of the mobile terminal can be embodied on the mobile terminal by running at least one or more application programs saved in the memory 170.

Referring still to FIG. 1A, various components depicted in this figure will now be described in more detail.

Regarding the wireless communication unit 110, the broadcast receiving module 111 is typically configured to receive a broadcast signal from and/or broadcast associated information to an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit to and/or receive wireless signals from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSUPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee™, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. The position corresponding to the proximity touch of the pointer relative to the touch screen will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and causes output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180 itself, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one of a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output module 152a, the second audio output module 152b, the proximity sensor 141, the illumination sensor 142, the light output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth™ port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 10, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
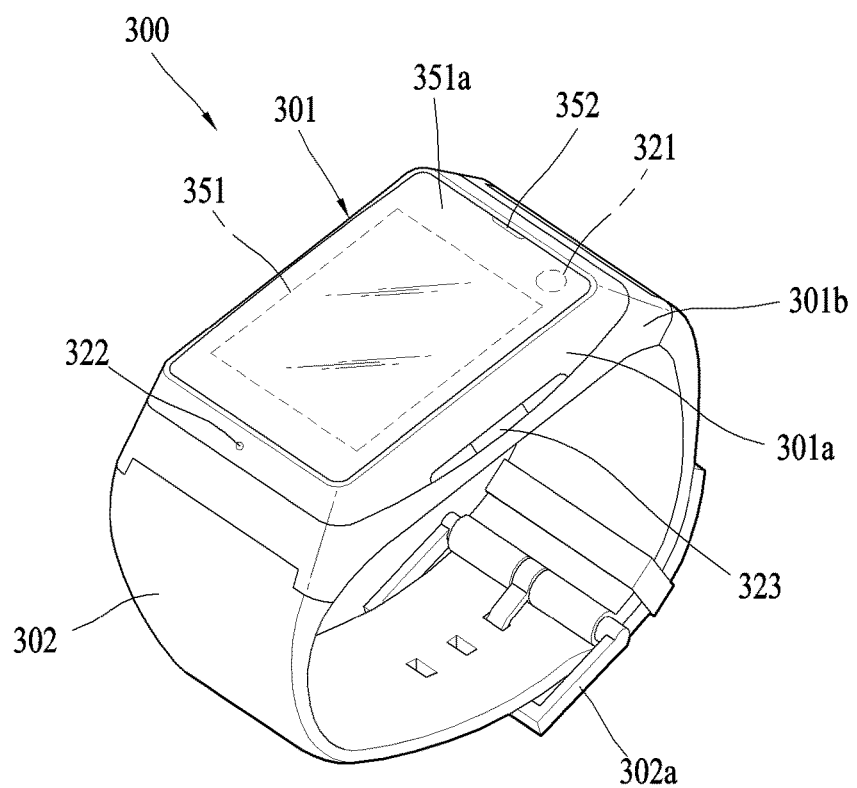
FIG. 2 is a perspective diagram for one example of a mobile terminal device of a watch type related to another embodiment of the present invention.

FIG. 2 is a perspective view illustrating one example of a watch-type mobile terminal 300 in accordance with another exemplary embodiment.

As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro™ type, or the like, and include a flexible section or material. The drawing illustrates an example that the fastener 302a is implemented using a buckle. [be consistent]

Further preferred embodiments will be described in more detail with reference to additional drawing figures. It is understood by those skilled in the art that the present features can be embodied in several forms without departing from the characteristics thereof.

Figure 3:
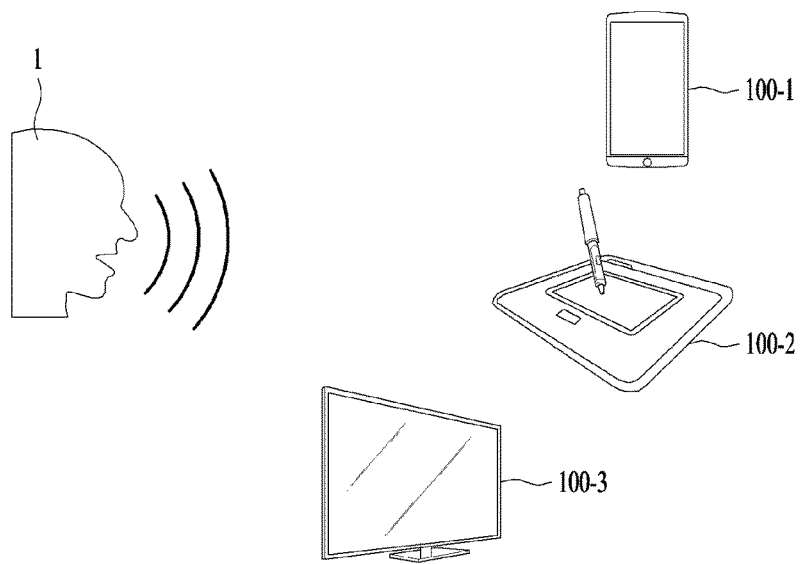
FIG. 3 is a diagram to describe a network system according to one embodiment of the present invention.

FIG. 3 is a diagram to describe a network system according to one embodiment of the present invention.

Referring to FIG. 3, a user 1 and a plurality of terminal devices 100-1, 100-2 and 100-3 are illustrated. For instance, a plurality of the terminal devices 100-1, 100-2 and 100-3 may include a smartphone, a wearable device, a tablet PC, a desktop PC, a notebook, a printer, a TV, a refrigerator, an air conditioner, an electric fan, an air cleaner, an audio device and the like. In particular, a plurality of the terminal devices 100-1, 100-2 and 100-3 may include any device configured to electrically operate by including a communication unit.

The user 1 can input a command toward a plurality of the terminal devices 100-1, 100-2 and 100-3. According to the embodiment shown in FIG. 3, the user 1 inputs a command to a plurality of the terminal devices 100-1, 100-2 and 100-3. For instance, the user 1 may input a command using voice or a gesture. For another instance, the user 1 may input a command using a separate input means such as a remote controller or the like. In this case, the separate input means can output a signal that can be received by each of a plurality of the terminal devices 100-1, 100-2 and 100-3.

Like the example shown in FIG. 3, if a user inputs a command with a voice, a plurality of the terminal devices 100-1, 100-2 and 100-3 can receive the input of the user's command. In some cases, a prescribed terminal device (not shown in the drawing) may not be able to receive the input of the user's voice. For instance, when the user possesses a smartphone and a tablet PC in a bedroom, a TV may be located in a living room. If the user inputs a command with a voice, the smartphone and the tablet PC can directly receive the input of the user's voice. Yet, the TV may not be able to receive the input of the user's voice directly. Having received the input of the user's command directly, the smartphone can transmit its state information to another terminal device. And, the table PC having received the input of the user's command directly can transmit its state information to another terminal device. The TV can receive the state information transmitted by each of the smartphone and the tablet PC. The TV receives the state informations of other terminal devices and is then able to transmit its state information to the corresponding terminal devices. Each of the smartphone and the tablet PC can receive state informations of other terminal devices as well. Thus, every terminal device can transmit its state information and is able to receive state information of another terminal device. Each terminal device can determine whether it has priority for the user's command by comparing its state information to the received state information. And, a single terminal device having the highest priority can execute the user's command.

If the user speaks a desired command without specifying a device, each terminal device transmits and receives state information, whereby a terminal device having a priority for the user's command can be determined. Moreover, in association with the user's command, a single terminal device having a highest priority can execute the user's command. Hence, the present invention is advantageous in that an optimal terminal device can execute a user's command. In the following description, a process including the steps of determining a priority by transmitting and receiving state information and enabling a single optimal terminal device to execute a command is described in detail with reference to the accompanying drawings.

Figure 4:
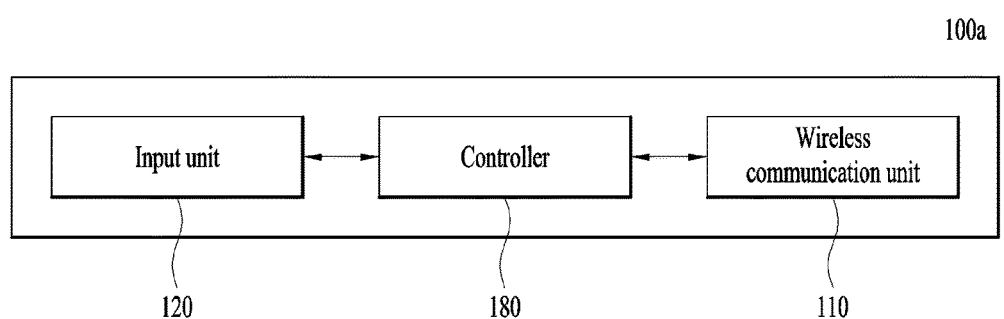
FIG. 4 is a block diagram of a terminal device according to one embodiment of the present invention.

FIG. 4 is a block diagram of a terminal device according to one embodiment of the present invention.

Referring to FIG. 4, a terminal device 100a can include an input unit 120, a controller 180, and a wireless communication unit 110.

The input unit 120 can receive an input of a user's command. For instance, the input unit 120 can include at least one of a microphone 122, a camera 121, a sensor and the like. If the input unit 120 includes the microphone, the input unit 120 can receive an input of a user's voice command. If the input unit 120 includes the camera, the input unit 120 can receive an input of a user's gesture command. If the input unit 120 includes the sensor, the input unit 120 can receive an input of a user's command inputted through a separate input means.

If the terminal device 100a is located in a place at which a user's command can be received, the terminal device 100a can receive an input of the user's command directly through the input unit 120. On the contrary, if the terminal device 100a is not located in a place at which a user's command can be received, the terminal device 100a is unable to receive an input of the user's command directly.

The communication unit 110 transmits its state information by broadcasting and is also able to receive state information of a different terminal device by broadcasting. Since the communication unit 110 transceives state informations by broadcasting, the communication unit 110 can transmit state information to all terminal devices in a predetermined range without specifying a counterpart terminal device. Having transmitted the state information, the terminal device may not check whether the counterpart terminal device has received the transmitted state information. Hence, the communication unit 110 transmits state information quickly with small load and is able to receive state information of a different terminal device. Moreover, the terminal device 100a can execute an optimal command through communications among terminal devices without a header that functions as a gate.

The controller 180 recognizes an inputted command and is able to detect state information. For instance, if a user gives a command with voice, the terminal device 100a can receive a voice signal through the input unit 120. Likewise, if a user gives a command with a gesture, the terminal device 100a can receive a video signal through the input unit 120. The controller 180 detects a meaningful command by analyzing the inputted signal and is then able to recognize the detected command. And, the controller 180 can detect the state information based on the inputted signal and the recognized command. In this case, the state information means the information for determining a priority for the recognized command. The state information shall be described in detail later.

The controller 180 can compare the detected state information to the received state information of an external device. If the detected state information has a high priority, the controller 180 can execute the recognized command. As mentioned in the foregoing description, the communication unit 110 can transmit state information by broadcasting and receive state information of a different terminal device by broadcasting. Hence, the terminal device 100a can receive state informations of all other terminal devices existing within a predetermined range. The terminal device 100a is able to determine whether a priority of the state information of the terminal device 100a is high by comparing the state information of the terminal device 100a to the received state informations of all other terminal devices. For instance, if a command recognized by a TV is 'play movie' and a priority of state information of the TV is high, the TV can play the movie. Meanwhile, if a priority of detected state information is low, the controller 180 may not execute a recognized command. In this case, since an external terminal device having a highest priority of state information exists, the external terminal device having the highest priority of the state information can execute the recognized command.

Generally, a program or system for periodically collecting information and performing a prescribed service without user's intervention in a dynamic environment is called an intelligent agent. In particular, the intelligent agent interacts with an external environment using a sensor. In this case, the external environment may mean one of an operating system, a network and the like. The intelligent agent may have a knowledge base and a reasoning function and is able to solve a problem through information exchange and communication with a user, a resource and/or another agent.

The intelligent agent makes its own decision and operates without direct/indirect intervention of another entity. The intelligent agent can control an operation or state. The intelligent agent can interact with a person or another agent using a communication language. The intelligent agent recognizes such an environment as a system, an internet or the like, thereby reacting with a change and operating with the initiative. And, the intelligent agent can perform a continuous operation instead of a one-time operation in response to a similar input.

In the present specification, each terminal device may mean an intelligent agent (hardware) or a device including an intelligent agent (software). A terminal device (or an intelligent agent) can react to a user's stimulus. The terminal device extracts its information and then sends it to a different terminal device and is also able to receive information from the different terminal device. The terminal device compares the extracted information of its own to the received information of the different terminal device and a single optimal terminal device can execute a user's command. In particular, the terminal device can mutually work with the different terminal device by negotiation and may include such property as autonomy, sociality, reactivity and activity. The terminal device cooperates with the different terminal device repeatedly instead of one-time-only cooperation, thereby executing user's various commands. Therefore, the terminal device can include the properties of time continuity, adaptability and cooperativity.

In the present specification, a terminal device having received an input of a user's command directly can actively handle the user's command. Hence, a terminal device receiving an input of a user's command directly shall be named an active terminal device or an active agent. On the other hand, a terminal device unable to receive an input of a user's command directly shall be named a passive terminal device or a passive agent. Each of the active agent and the passive agent may mean an intelligent agent.

An environment for a communication between terminal devices is described in detail as follows.

Figure 5:
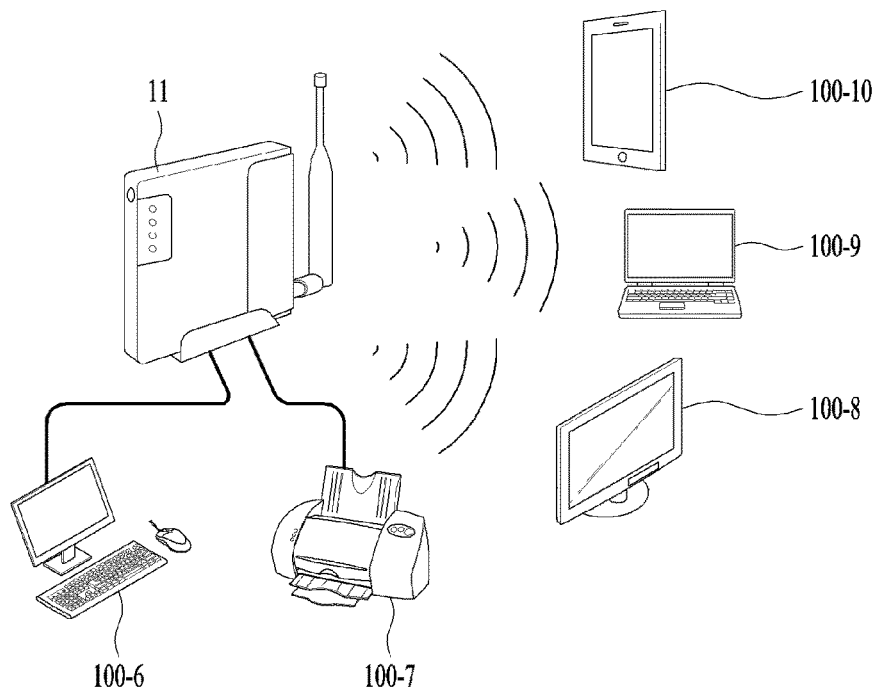
FIG. 5 is a diagram to describe one embodiment of a system connected to a modem.

FIG. 5 is a diagram to describe one embodiment of a system connected to a modem.

Referring to FIG. 5, a plurality of terminal devices 100-6 to 100-10 connected to a modem 11 (or a router) by wire/wireless are illustrated. The modem 11 connects an external network and a local network to each other and is able to establish the local network. The terminal devices 100-6 and 100-7 may be connected to the modem 11 by wire. And, the rest of the terminal devices 100-8, 100-9 and 100-10 may be connected to the modem 11 by wireless. Each of the terminal devices 100-6 to 100-10 can include identification information such as IP (internet protocol) individually. Each of the terminal devices 100-6 to 100-10 included in the local network is unable to know the presences of other terminals devices but is able to transmit its state information to the rest of the connected terminal devices corresponding to the identification informations by broadcasting.

Figure 6:
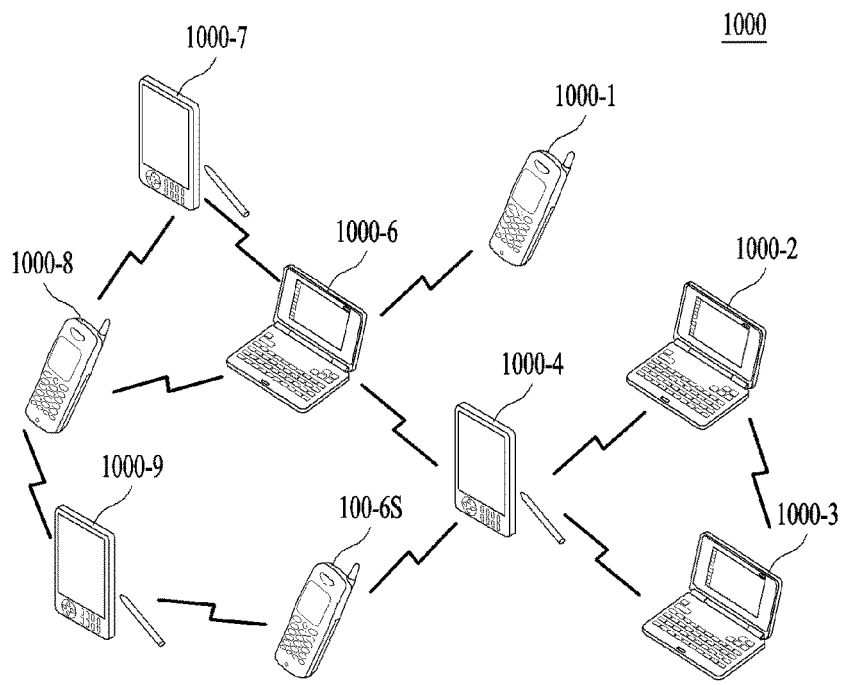
FIG. 6 is a diagram to describe one embodiment of a system connected to a short range communication network.

FIG. 6 is a diagram to describe one embodiment of a system connected through a short range communication network.

Referring to FIG. 6, a network system 1000 including a plurality of terminal devices 1000-1 to 1000-9 is illustrated. Each of the terminal devices may not be connected to a single local network. Some of the terminal devices may be connected to an external communication network (e.g., LTE network). In this case, the terminal device is unable to discover a nearby terminal device. Hence, the terminal device can search for external terminal devices in a predetermined range by performing a discovery procedure. For instance, the terminal device and the external device existing in the predetermined range can discover each other through a short range communication network such as Bluetooth™

Low Energy (BLE) and the like. Each of the discovered terminal devices can be connected to a single network using a personal ID, a password and/or the like. If the terminal device recognizes a user's command, the terminal device sends state information to the external terminal device connected to the single network and is able to receive state information from the connected external terminal device.

Figure 7:
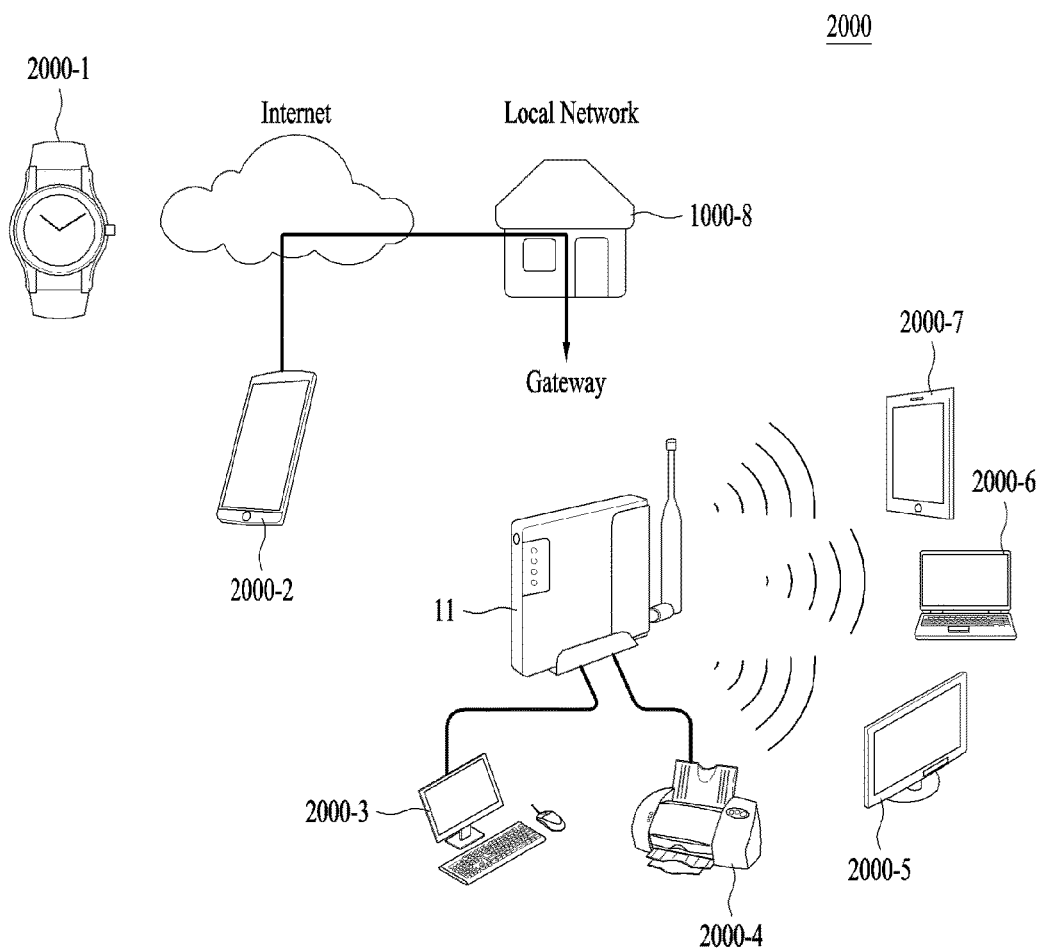
FIG. 7 is a diagram to describe a system connected to an external communication network according to one embodiment of the present invention.

FIG. 7 is a diagram to describe a system connected to an external communication network according to one embodiment of the present invention.

Referring to FIG. 7, a network system 2000 connected to an internal/external communication network is illustrated. The network system 2000 may include a plurality of terminal devices 2000-1 to 2000-7. Some of the terminal devices are connected to the external communication network, while the rest of the terminal devices are connected to the internal communication network. In particular, as mentioned in the foregoing description with reference to FIG. 5, some of the terminal devices 2000-3 to 2000-7 can configure a local network by being connected to a modem (or a router) 11. The rest of the terminal devices can be connected to the external communication network through Internet 2000-1 2000-2.

Irrespective of locations, some of the terminal devices can configure the local network by being connected to the internal communication network and the rest of the terminal devices can be connected to the external communication network. For instance, when a user possesses a TV 2000-5, a desktop PC 2000-3, a smartphone 2000-2 and a wearable device 2000-1 located in the same space, the TV and the desktop PC can be connected to the internal communication network through a modem 11 and the smartphone and the wearable device can be connected to the external communication network such as LTE network. The terminal device connected to the external communication network can be connected to the internal communication network via Internet. The terminal device connected to the external communication network can pass through a gateway 1000-8 that connects the internal communication network and the Internet to each other. The terminal device connected to the internal communication network can inform the terminal device, which is connected to the external communication network, of an address of a gateway accessible to the local network.

Figure 8:
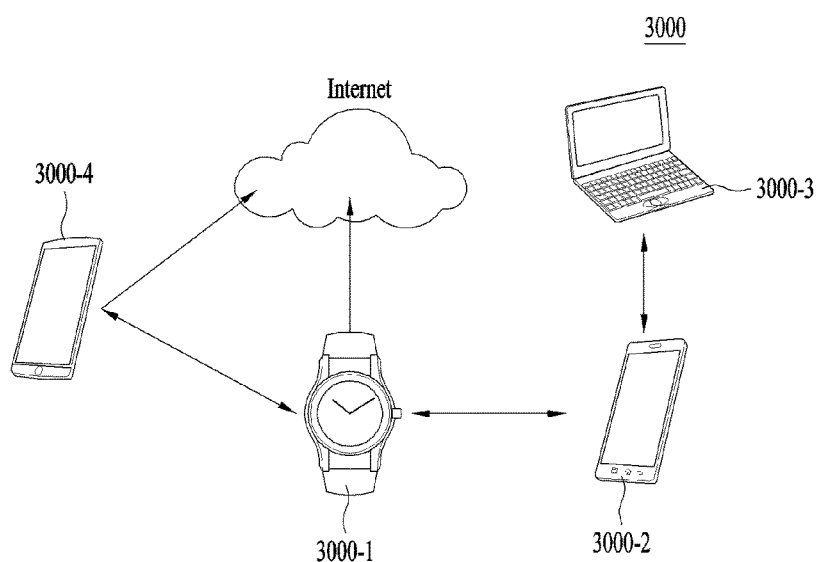
FIG. 8 is a diagram to describe a system of an independent network environment according to one embodiment of the present invention.

FIG. 8 is a diagram to describe a system of an independent network environment according to one embodiment of the present invention.

Referring to FIG. 8, an independent network 3000 is illustrated. Terminal devices 3000-4 to 3000-1 may not configure a local network. Instead, all terminal devices are connected to an external communication network or some of the terminal devices may be connected to the external communication network. A terminal device discovers a nearby terminal device through a short range communication network such as BLE™ or the like and is then able to configure an inter-terminal Ad-hoc network.

Each terminal device can authenticate that it belongs to the same owner using a personal ID, a password and/or the like. Although each terminal device does not belong to the same owner, it can be included in the Ad-hoc network using a person ID or a password in accordance with the permission from the owner. A terminal device can inform an external terminal device of an address of each terminal device accessible through the Internet. When one terminal device inaccessible to Internet communicates with another terminal device existing outside a short range communication network, it is able to perform the communication through a prescribed terminal device connected to the short range communication network with the internet accessibility. A terminal device connected to an external communication network can be connected to a local network in a home through the Internet. The terminal device connected to the external communication network can be connected to the local network via a gateway.

So far, various networks for connecting terminal devices are described. In the following description, a process for transmitting state informations among a plurality of terminal devices is described in detail.

Figure 9:
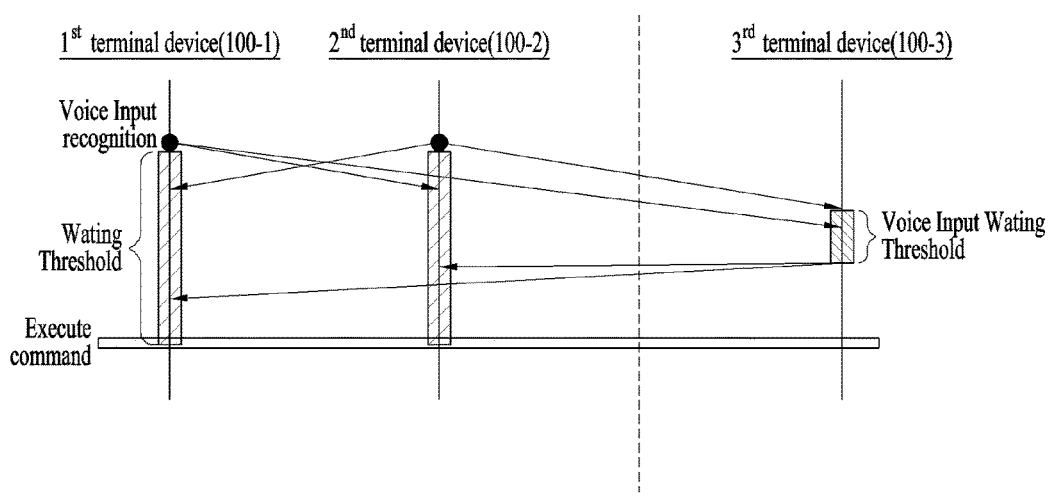
FIG. 9 is a diagram to describe a process for transmitting state information among a plurality of terminal devices according to one embodiment of the present invention.

FIG. 9 is a diagram to describe a process for transmitting state information among a plurality of terminal devices according to one embodiment of the present invention.

Referring to FIG. 9, a 1st terminal device 100-1, a 2nd terminal device 100-2 and a 3rd terminal device 100-3 are illustrated. The 1st terminal device 100-1 and the 2nd terminal device 100-2 are located in the same space of a user, while the 3rd terminal device 100-3 may be located in a space different from the user located space. According to one embodiment, the user can give a command with a voice. The 1st terminal device 100-1 and the 2nd terminal device 100-2 located in the same space of the user can receive an input of a user's command directly. In particular, each of the 1st terminal device 100-1 and the 2nd terminal device 100-2 can recognize the user's voice input. Yet, the 3rd terminal device 100-3 located in the space different from the user located space is unable to directly receive an input of the user's command. Each of the 1st terminal device 100-1 and the 2nd terminal device 100-2, which can receive the input of the user's command directly, shall be named an active terminal device or an active agent. The 3rd terminal device 100-3 unable to receive the input of the user's command directly shall be named a passive terminal device or a passive agent.

Having recognized the user's command, each of the 1st terminal device 100-1 and the 2nd terminal device 100-2 is able to output state information by broadcasting. And, each of the 1st terminal device 100-1 and the 2nd terminal device 100-2 is able to receive state information outputted from a different external device by broadcasting for a waiting threshold time. In this case, the waiting threshold time may be previously set to a time between a timing point of recognizing a user's command and a timing point of determining whether to execute the command. The waiting threshold time may be set in consideration of a state time reception time, a processing capability of a terminal device, and the like.

Meanwhile, the 3rd terminal device 100-3 is unable to receive the input of the user's command directly. Yet, the 3rd terminal device 100-3 is able to receive an active terminal device's state information outputted by broadcasting from the active terminal device. In the 3rd terminal device 100-3, a time between a timing point of receiving the state information of the active terminal device and a timing point of outputting the state information by broadcasting can be set as an input waiting threshold time. In some cases, the input waiting threshold time may be set to a time between a timing point of receiving the state information of the active terminal device and a timing point of determining whether to execute the command.

Each of the waiting threshold time of the active terminal device and the input waiting threshold time of the passive terminal device does not need to be set to the same time. It is enough for the waiting threshold time to be set to a time for receiving state informations from all terminal devices connected to a network, analyzing the received state information, and determining whether to execute. And, it is enough for the input waiting threshold time to be set to a time for receiving state informations from all terminal devices, outputting state information of its own, analyzing the state informations of all terminal devices, and determining whether to execute.

Each terminal device compares its state information to received state information. Only a terminal device having a highest priority based on its own state information executes a user's command. Hence, since the user's command is not executed redundantly despite a waiting time difference, the waiting threshold time or the input waiting threshold time needs not to be synchronized between the terminal devices.

In the following description, information included in output state information and a procedure for determining a priority is described in detail.

FIG. 10 is a diagram to describe a transmitted data packet according to one embodiment of the present invention.

Referring to FIG. 10, a data packet of transmitted state information is illustrated. A data packet of state information may include a source IP address, a command data, a command priority, a time, a flag, a distance and an option. The source IP address indicates an IP address of a terminal device (or an agent) transmitting a state information data packet. The command data indicates a recognized command. In case of an active terminal device, the command data means a command recognized by receiving an input of a user's command. In case of a passive terminal device, the command data may mean a command recognized by being extracted from received state information of an active terminal device.

The command priority indicates a priority of a recognized command set in a terminal device that transmits state information. For instance, if a terminal device is a TV, a movie play command may have a command priority set to 'A' and a music play command may have command priority set to 'B'. Hence, if the TV recognizes the movie play command, the command data and the command priority can become 'movie play' and 'A', respectively. If the TV recognizes the music play command, the command data and the command priority can become 'music play' and 'B', respectively.

The time indicates a timing of inputting a user's command to a terminal device. In case of an active terminal device, the time may mean a timing of directly inputting a user's command to a terminal device. In case of a passive terminal device, the time may mean a timing of receiving state information initially from an active terminal device.

The flag indicates whether a user's command is inputted directly. For instance, a flag value of an active terminal device may become T (true), while a flag value of a passive terminal device may become F (false). For another instance, a flag value of an active terminal device may become 1, while a flag value of a passive terminal device may become 0. The distance indicates a distance between a user and a terminal device. The distance can be identified through a microphone if a voice input is received. The option indicates additional state information of a terminal device. For instance, a smartphone can be combined with a speaker deck. When the smartphone is not combined with the speaker deck, the option can become 0. When the smartphone is combined with the speaker deck, the option can become 1. Since the option can give a weight to a priority of a command, as will be mentioned in the following description, the option can be called a weight data.

Generally, a terminal device can compare its state information to received state information. The terminal device can determine whether to execute a command depending on a command data and a command priority according to the command data. In case of the same command priority, the terminal device can determine whether to execute a command in consideration of a time, a flag, a distance and an option. For instance, the terminal device can determine whether to execute a command by determining a priority of state information in order of a flag, an option, a time and a distance. In particular, the terminal device receives a user's command directly and is then able to determine that state information having a flag value set to 'T' has a priority. The terminal device can determine that a state information having a distance close to a user among a plurality of state informations having flag values set to 'T' has a priority. The terminal device can determine a priority of state information by giving a weight according to an option value. Moreover, the terminal device scores a time, a flag, a distance and an option and is then able to determine whether to execute a command by comparing the totalized scores.

FIG. 11 is a diagram to describe commands corresponding to a terminal device according to one embodiment of the present invention.

Referring to FIG. 11, a command executed in a prescribed terminal device and a priority of the command are illustrated. For instance, a TV is a terminal device configured to mainly play images. And, the TV may play music contents as well. Yet, the TV may not include a cleaning function or a call function. Hence, priority of a command 'play a movie' corresponding to a movie play function can be set to A. And, a priority of a command 'play music' corresponding to a music play function can be set to B. Moreover, a priority of a command 'start cleaning' or 'make a phone call to AAA' not related to the TV functions may be set to an invalid value. Yet, if the TV includes a call function, a priority of a command related to the call function can be set to B. Moreover, a priority of a command related to a video call may be set to A and a priority of a command related to a voice call may be set to B.

A mobile phone is mainly configured to provide a call function. And, the mobile phone may be able to play contents. Yet, the mobile phone may not include a cleaning function. Hence, a priority of a command corresponding to a movie play function or a music play function may be set to B. A priority of a command corresponding to a call function may be set to A. And, a priority of a command corresponding to a cleaning function not related to the mobile phone may be set to an invalid value. According to the example shown in FIG. 11, a priority of a command corresponding to a movie play function or a music play function is set to B. Yet, the priority of the command corresponding to the movie play function or the music play function may be set to A or C depending on user's settings or performance of the mobile phone.

A tablet PC can play contents. The tablet PC may not include a cleaning function. Hence, a priority of a command corresponding to a movie play function, a music play function, or a call function can be set to B. And, a priority of a command related to the cleaning function having nothing to do with the tablet PC can be set to an invalid value. Meanwhile, a priority of a command related to a content play function of the tablet PC can be set to A or C depending on user's settings or performance of the tablet PC.

A cleaner is a terminal device mainly configured to provide a cleaning function. Hence, a priority of a command related to the cleaning function can be set to A. And, a priority of a command related to a movie play function, a music play function, or a call function can be set to an invalid value. Yet, if the cleaner includes a music play function, a priority of a command related to the music play function can be set to B or C.

If a user's command is inputted, an active terminal device can detect state information of its own based on the inputted command. The active terminal device outputs the state information of its own and is also able to receive state information of an external device. A passive terminal device receives the state information of the active terminal device and is then able to detect state information of its own. And, the passive terminal device can output the detected state information of its own. State information may include command priority data. A terminal device can determine a priority of the state information by comparing a command priority data included in detected state information to a command priority data included in received state information of an external device. If the terminal device determines that the priority of the state information of its own is higher, the terminal device can launch a function corresponding to a recognized command.

Although the priority values are described as A, B and the like in FIG. 11, they can be set to numerals. In the following description, embodiments for a terminal device to launch a function by comparing a priority of state information are explained in detail.

Figure 12:
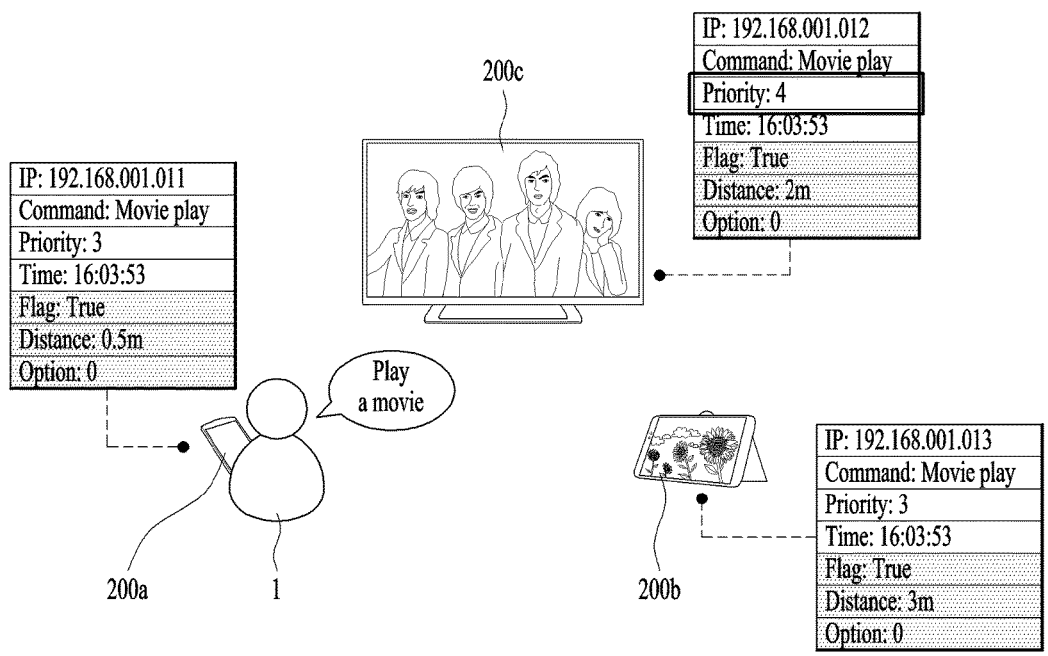
FIG. 12 is a diagram to describe a 1st embodiment of executing a user's command.

FIG. 12 is a diagram to describe a 1st embodiment of executing a user's command.

Referring to FIG. 12, a smartphone 200a, a tablet PC 200b and a TV 200c exist around a user 1. In doing so, the user 1 can give a command 'Play a movie' without specifying a terminal device. Since each of the smart phone 200a, the tablet PC 200b and the TV 200c exists around the user 1, it can receive an input of a user's command directly.

The smartphone 200a may receive the input of the user's command at 16:03:53. Hence, a corresponding flag value may be T (true). The smartphone 200a analyzes the inputted command and is then able to recognize it as a movie play command. A priority of the movie play command in the smartphone 200a may be set to 3. And, the smartphone 200a can calculate a distance from the user based on the input time of the command. In particular, the smartphone 200a may calculate the distance from the user as 0.5 m. Since the smartphone 200a is not combined with additional devices, an option can be set to 0. And, the smartphone 200a can output state information of its own by broadcasting.

The tablet PC 200b may receive the input of the user's command at 16:03:53 as well. Hence, a corresponding flag value may be T (true). The tablet PC 200b analyzes the inputted command and is then able to recognize it as a music play command. A priority of the music play command in the tablet PC 200b may be set to 3. And, the tablet PC 200b can calculate a distance from the user based on the input time of the command. In particular, the tablet PC 200b may calculate the distance from the user as 3 m. Since the tablet PC 200b is not combined with additional devices, an option can be set to 0. And, the tablet PC 200b can output state information of its own by broadcasting as well.

The TV 200c may receive the input of the user's command at 16:03:53 as well. Hence, a corresponding flag value may be T (true). The TV 200c analyzes the inputted command and is then able to recognize it as a movie play command. A priority of the movie play command in the TV 200c may be set to 4. And, the TV 200c can calculate a distance from the user based on the input time of the command. In particular, the TV 200c may calculate the distance from the user as 2 m. Since the TV 200c is not combined with additional devices, an option can be set to 0. And, the TV 200c can output state information of its own by broadcasting as well.

Since each of the smartphone 200a, the tablet PC 200b and the TV 200c receives the input of the user's command directly, it can be called an active terminal device (or an active agent). And, each of the smartphone 200a, the tablet PC 200b and the TV 200c can receive a state information of another terminal device.

According to one embodiment, a terminal device can determine a priority of a command most preferentially. Since a priority of a command included in state information of the Tablet PC 200c is higher than that of a command included in state information of each of the smartphone 200a and the tablet PC 200b, each of the smartphone 200a and the table PC 200b may not execute a user's command. Since the priority of the command included in the state information of the TV 200c is higher than that of the command included in the state information of another external device, the TV 200c can execute the user's command. Therefore, only the TV 200c can play a movie.

Figure 13:
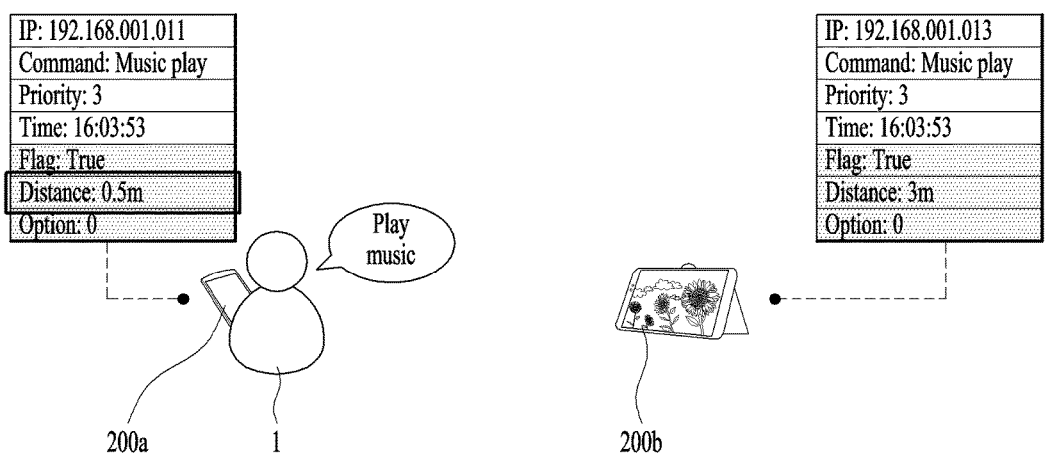
FIG. 13 is a diagram to describe a 2nd embodiment of executing a user's command.

FIG. 13 is a diagram to describe a 2nd embodiment of executing a user's command.

Referring to FIG. 13, a user 1 possesses a smartphone 200a and a tablet PC 200b. The user 1 can give a command 'Play music'. Since the smartphone 200a and the tablet PC 200b exist around the user 1, they can receive the command of the user 1 directly.

Since the smartphone 200a receives the input of the user's command directly, a flag may be T (true). The smartphone 200a analyzes the inputted command and is then able to recognize it as a music play command. A priority of the music play command in the smartphone 200a may be set to 3. Based on the input time of the command. The smartphone 200a may calculate a distance from the user as 0.5 m. Since the smartphone 200a is not combined with additional devices, an option can be set to 0. And, the smartphone 200a can output state information of its own by broadcasting.

Since the tablet PC 200b receives the input of the user's command as well, a corresponding flag value may be T (true). The tablet PC 200b analyzes the inputted command and is then able to recognize it as a music play command. A priority of the music play command in the tablet PC 200b may be set to 3. Based on the input time of the command, the tablet PC 200b may calculate a distance from the user as 3 m. Since the tablet PC 200b is not combined with additional devices, an option can be set to 0. And, the tablet PC 200b can output state information of its own by broadcasting as well.

One of the smartphone 200a and the tablet PC 200b can receive state information of the other. The smartphone 200a can compare a priority of a command included in the state information of its own to that of a command included in the received state information of the tablet PC 200b. Since the priorities of the commands of the two terminal devices are equal to each other as 3, the smartphone 200a can compare other properties included in the state informations. For example, the terminal device can compare distance data next to the priority of the command to each other. In particular, if a priority of the detected priority data included in the state information of the terminal device is equal to a priority of the priority data included in the received state information of the external device, the terminal device can determine a priority of the state information by comparing distance data. Since a distance from the user included in the state information of the smartphone 200a is smaller than a distance from the user included in the state information of the tablet PC 200*b*, the smartphone 200*a* can execute the user's command.

Meanwhile, the tablet PC 200*b* can compare a priority of a command in the first place. Since the priorities of the commands of the two terminal devices are equal to each other, the tablet PC 200*b* can compare distance data. Since a distance from the user included in the state information of the tablet PC 200*b* is greater than a distance from the user included in the state information of the smartphone 200*a*, only the smartphone 200*a* can play the music.

Figure 14:
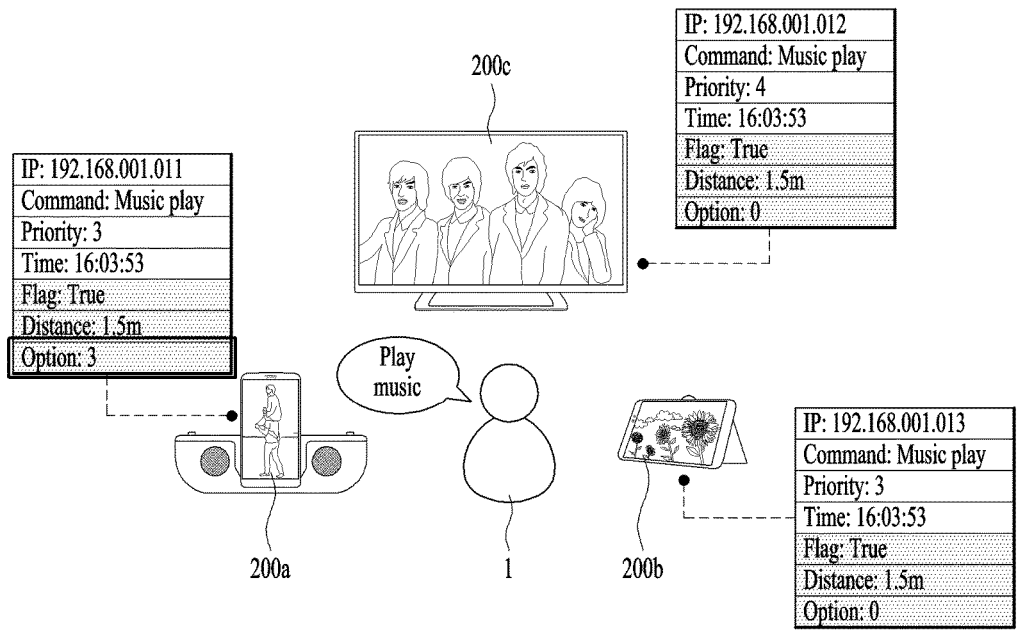
FIG. 14 is a diagram to describe a 3rd embodiment of executing a user's command.

FIG. 14 is a diagram to describe a 3rd embodiment of executing a user's command.

Referring to FIG. 14, a smartphone 200*a*, a tablet PC 200*b* and a TV 200*c* coexist with a user 10 in the same space. The user 1 can give a command 'Play music'. Since the smartphone 200*a* receives the input of the user's command directly, a flag may be T (true). The smartphone 200*a* analyzes the inputted command and is then able to recognize it as a music play command. A priority of the music play command in the smartphone 200*a* may be set to 3. The smartphone 200*a* may calculate a distance from the user as 1.5 m. Meanwhile, the smartphone 200*a* is connected to a deck that is an additional device. Hence, an option (or a weight data) indicating an additional weight of the smartphone 200*a* can be set to 3. The option can be set variously in advance in accordance with a user's command and a combination of combinable devices. And, the smartphone 200*a* can output state information of its own by broadcasting.

Since the tablet PC 200*b* receives the input of the user's command as well, a corresponding flag value may be T (true). The tablet PC 200*b* analyzes the inputted command and is then able to recognize it as a music play command. A priority of the music play command in the tablet PC 200*b* may be set to 3. The tablet PC 200*b* may calculate a distance from the user as 1.5 m. Since the tablet PC 200*b* is not combined with additional devices, an option can be set to 0. And, the tablet PC 200*b* can output state information of its own by broadcasting as well.

Since the TV 200*c* receives the input of the user's command as well, a corresponding flag value may be T (true). The TV 200*c* analyzes the inputted command and is then able to recognize it as a music play command. A priority of the music play command in the TV 200*c* may be set to 4. The TV 200*c* may calculate a distance from the user as 1.5 m. Since the TV 200*c* is not combined with additional devices, an option can be set to 0. And, the TV 200*c* can output state information of its own by broadcasting as well.

Each of the smartphone 200*a*, the tablet PC 200*b* and the TV 200*c* can receive a state information of another external device and is then able to compare the received state information to a state information of its own. In particular, the smartphone 200*a* can compare a priority of a command included in the state information of its own to that of a command included in the received state information of the external device. In doing so, the smartphone 200*a* can compare a value generated from adding a priority of a command and an option together. In particular, the terminal device adds a weight data to a command priority data and then compares the added command priority data and is then able to determine a priority of state information. The added command priority of the smartphone 200*a* is 6, the added command priority of the tablet PC is 3, and the added command priority of the TV 200*c* is 4. Hence, the smartphone 200*a* is able to execute the recognized user's command.

In the same manner, each of the tablet PC 200*b* and the TV 200*c* can compare the added command priority of its own to the received added command priority of the external device as well. Since the added command priority of the smartphone 200*a* is higher than that of each of the tablet PC 200*b* and the TV 200*c*, each of the tablet PC 200*b* and the TV 200*c* may not execute the user's command. Hence, the smartphone 200*a* combined with the deck can execute the music play command.

Figure 15:
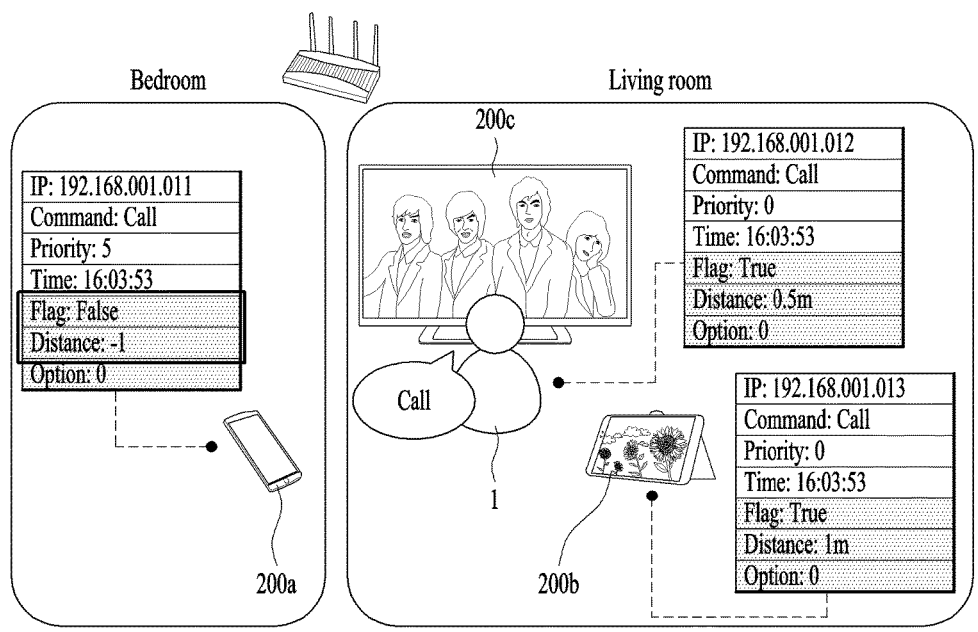
FIG. 15 is a diagram to describe a 4th embodiment of executing a user's command.

FIG. 15 is a diagram to describe a 4th embodiment of executing a user's command.

Referring to FIG. 15, a smartphone 200*a*, a tablet PC 200*b* and a TV 200*c* are illustrated. The tablet PC 200*b* and the TV 200*c* coexist with a user 1 in a living room, while the smartphone 200*a* exists in a bed room. The user can give a command 'make a phone call to AAA'.

Since each of the tablet PC 200*b* and the TV 200*c* receives an input of the user's command directly, each of the tablet PC 200*b* and the TV 200*c* can analyze and recognize the inputted command as a call command. Each of the tablet PC 200*b* and the TV 200*c* may not be able to launch a call function. Hence, a command priority of each of the tablet PC 200*b* and the TV 200*c* may be set to 0. Since each of the tablet PC 200*b* and the TV 200*c* are not combined with additional devices, an option can be set to 0. Meanwhile, the tablet PC 200*b* calculates a distance from the user 1 as 0.5 m and the TV 200*c* can calculate a distance from the user 1 as 1.5 m, based on an input time of the user's command. Each of based on an input time of the user's command can output a state information of its own by broadcasting. And, the tablet PC 200*b* and the TV 200*c* may differ from each other in state information output time.

Meanwhile, since the smartphone 200*a* is located in a space different from that of the user 1, it may not receive the input of the user's command directly. The smartphone 200*a* can receive a state information from each of the tablet PC 200*b* and the TV 200*c*. In particular, the smartphone 200*a* may receive either the state information of the tablet PC 200*b* or the state information of the TV 200*c* in the first place. If receiving state information from another external device, the smartphone 200*a* can recognize that the user 1 has given the command. Based on the received state information of another external device, the smartphone 200*a* can detect the user's command. Since the smartphone 200*a* fails to receive the input of the user's command directly, a flag may be F (false). In particular, the smartphone 200*a* may be a passive terminal device (or a passive agent). The smartphone 200*a* may recognize that the user's command is a call command. A priority of the call command in the smartphone 200*a* may be set to 5. Since the smartphone 200*a* fails to receive the input of the user's command directly, a distance may be set to −1. Since the smartphone 200*a* is not combined with additional devices, an option can be set to 0. The smartphone 200*a* outputs state information of its own by broadcasting. And, each of the tablet PC 200*b* and the TV 200*c* can receive the state information of the smartphone 200*a*.

Each of the terminal devices can compare the detected state information to the received state information. Since each of the tablet PC 200*b* and the TV 200*c* is unable to run the call function, a priority of the command is 0. Hence, the command priority of each of the tablet PC 200*b* and the TV 200*c* is lower than that of the smartphone 200*a*, each of the tablet PC 200*b* and the TV 200*c* may not execute the call command. Since the command priority of the smartphone 200a is higher than that of each of the tablet PC 200b and the TV 200c, the smartphone 200a can execute the call command.

Meanwhile, the smartphone 200a is located in a space different from that of the user 1. When the tablet PC 200b and the TV 200c are located in the same space of the user 1, the TV 200c is closer to the user 1 than the PC 200c. Based on the state information of the smartphone 200a, the state information of the tablet PC 200b and the state information of the TV 200c, the smartphone 200a can be aware that the TV 200c is located in a short distance from the user 1. Hence, although the smartphone 200a executes the call command, it may set a signal related to the call to the TV 200c. In particular, in case that an active terminal device is unable to execute a recognized command, a passive terminal device can send streaming data related to the recognized command to the active terminal device. Subsequently, the active terminal device receives the streaming data from the passive terminal device and is then able to process the received streaming data. Hence, although the smartphone 200a executes the user's command directly, the smartphone 200a sends the streaming data so that the TV 200c can execute the user' command indirectly. Thus, the user 1 can operate the terminal device located in the different space without moving away into the different space.

So far, according to the embodiment mentioned in the foregoing description, a single terminal device among a plurality of terminal devices operates in response to a single command given by a user 1. According to the description of the following embodiment, one terminal device executes a command of a user 1 and another terminal device executes a command associated with the user's command.

FIG. 16 is a diagram to describe an associated command set according to one embodiment of the present invention.

Referring to FIG. 16, one embodiment of a set of commands associated with a single command is illustrated. A command 'Play a movie' is a movie play command. A set of movie play commands may include a movie information search command and a remote controller execution command. A command 'Turn on a TV channel' is a TV play command. A set of the TV play commands may include a TV schedule table search command and a remote controller execution command. A command 'Let me know a recipe of a fried chicken stew' is a cooking method search command. A set of the cooking method search commands may include a retained material check command and a required material order command. A command 'Search for today's weather' is a weather search command. A set of the weather search commands may include a dehumidifier execution command, a humidifier execution command and an air cleaner execution command.

A 1st terminal device can execute a recognized command based on a priority of detected state information. In case that a command set associated with the recognized command exists, the 1st terminal device can transmit the associated command set to an external device by broadcasting. When a 2nd terminal device does not execute the recognized command based on the priority of the detected state information, the 2nd terminal device receives the associated command set transmitted by broadcasting and is then able to execute a single executable command included in the associated command set. The 2nd terminal device can determine whether to execute each associated command included in the associated command set transmitted by broadcasting in the same manner of a user's direct command.

Each of the 1st terminal device and the 2nd terminal device may include information on a command set associated with a user's command. If a user gives a command, the 1st terminal device executes a user's command in the manner mentioned in the above description. In doing so, each terminal device can output a state information on an associated command included in the command set related to the user's command as well as a user's direct command. The 2nd terminal device can execute a command of a top priority among the related commands included in the command set.

If a user gives a command, the terminal device executes a user's command in the manner mentioned in the foregoing description. The 1st terminal device recognizes an associated command related to a user's direct command and is able to receive state informations of a plurality of terminal devices. Hence, the 1st terminal device can transmit an execution signal of the associated command to the 2nd terminal device corresponding to the associated command. The 2nd terminal device receives the execution signal transmitted by the 1st terminal device and may be then able to execute the associated command.

The commands and the associated command sets shown in FIG. 16 illustrate one embodiment only and can be set in various ways. Various embodiments for executing an associated command set are described in detail as follows.

Figure 17A:
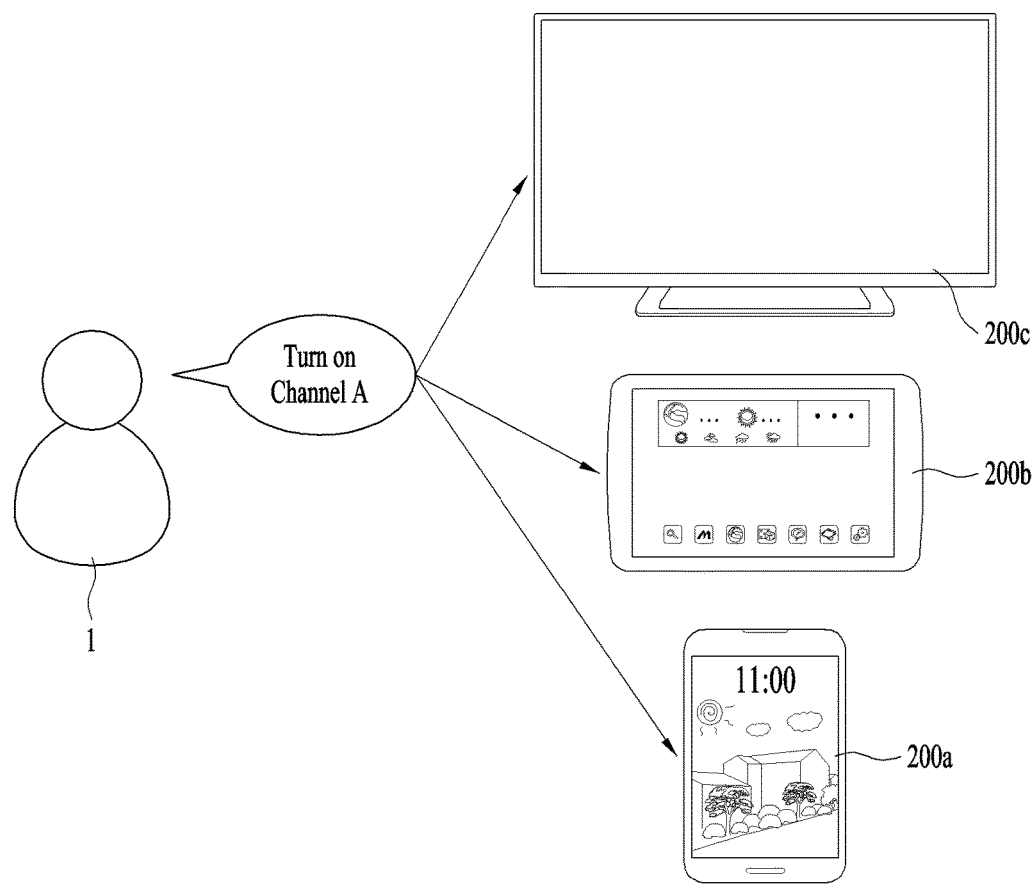
FIGS. 17A, 17B and 17C are diagrams to describe a 1st embodiment for a plurality of terminal devices to execute a user's command jointly.
Figure 17B:
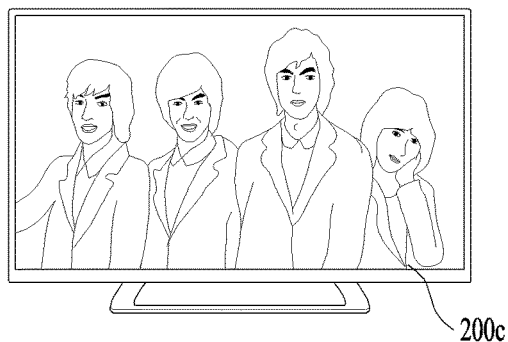
Figure 17C:
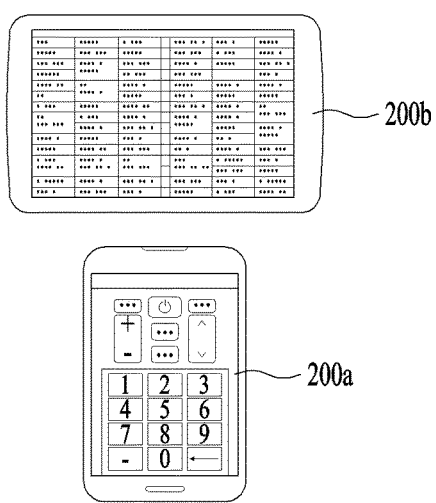

FIGS. 17A-17C are diagrams to describe a 1st embodiment for a plurality of terminal devices to execute a user's command jointly.

Referring to FIG. 17A, a user 1, a smartphone 200a, a tablet PC 200b and a TV 200c are illustrated. The user 1 may give a command 'Turn on Channel A'. In this case, the command 'Turn on Channel A' may be recognized as a Channel-A program play command. An associated command set of the Channel-A program play command may include a Channel-A schedule table search command and a remote controller execution command. An individual command included in the associated command set shall be named a subcommand.

Each of the smartphone 200a, the tablet PC 200b and the TV 200c receives an input the user's command 'Turn on Channel A' directly and is then able to recognize the received input as the Channel-A program play command. Each of the smartphone 200a, the tablet PC 200b and the TV 200c transmits state information of its own and is also able to receive state informations of other external devices. Each of terminal devices compares data included in the state information and one of the terminal devices can execute the user's direct command.

Referring to FIG. 17B, the TV 200c configured to execute the user's direct command is illustrated. A command priority of the TV 200c may be higher than that of each of the smartphone 200a and the tablet PC 200b. Hence, the TV 200c can execute the user's direct command. A process for executing a command has been described in detail and its details shall be omitted from the following description.

The TV 200c configured to directly execute the user's direct command can transmit an execution request signal of an associated command related to the user's direct command.

Referring to FIG. 17C, the smartphone 200a executing the associated command and the tablet PC 200b executing the associated command are illustrated. According to one embodiment, the TV 200c can transmit a Channel-A schedule table search command and a remote controller execution command by broadcasting. Each of the smartphone 200a and the tablet PC 200b can receive the Channel-A schedule table search command and the remote controller execution command. If receiving the execution command, each of the smartphone 200a and the tablet PC 200b can transmit state information related to the Channel-A schedule table search command and the remote controller execution command by broadcasting. And, each of the smartphone 200*a* and the tablet PC 200*b* can determine a priority for each of the commands. The tablet PC 200 may have a higher priority for the Channel-A schedule table search command and the smartphone 200*a* may have a higher priority for the remote controller execution command. Hence, the smartphone 200*a* executes a remote controller mode and the tablet PC 200*b* can display a Channel-A schedule table.

According to another embodiment, each of the smartphone 200*a*, the tablet PC 200*b* and the TV 200*c* may include a command set related to a user's direct command. If each of the smartphone 200*a*, the tablet PC 200*b* and the TV 200*c* receives the user's direct command, each of the smartphone 200*a*, the tablet PC 200*b* and the TV 200*c* is able to transmit a state information on a related associated command as well as the user's direct command. Each of the terminal devices can determine a priority for each of the user's direct command and the associated command. For instance, the TV 200*c* may have a top priority for the Channel-A program play command, the tablet PC 200*b* may have a top priority for the Channel-A schedule table search command, and the smartphone 200*a* may have a top priority for the remote controller execution command, Hence, the TV 200*c* plays the Channel-A program, the tablet PC 200*b* displays the Channel-A schedule table, and the smartphone 200*a* can execute the remote controller.

Another embodiment is available. The user 1 can give a command 'Turn on Channel A'. The command 'Turn on Channel A' can be recognized as a Channel-A program play command. And, an associated command set of the Channel-A program play command may include a Channel-A schedule table search command and a remote controller execution command.

Each of the smartphone 200*a*, the tablet PC 200*b* and the TV 200*c* may include a command set related to a user's direct command. For instance, each terminal device can save the user's direct command and the command set related to the user's direct command in the storage unit. In case that each of the terminal devices recognizes the user's direct command, it may be able to receive a command set related to the user's direct command through a server or the like. Each of the smartphone 200*a*, the tablet PC 200*b* and the TV 200*c* transmits state information of its own and is then able to receive state information of another external device. Each of the terminal devices compares data included in the state information and a single terminal device can execute the user's direct command. For instance, since the TV 200*c* is the device having a top priority of the Channel-A program play command that is the user's direct command, the TV 200*c* can play the Channel-A program.

Each of the smartphone 200*a* and the tablet PC 200*b* includes a related command set. Each of the smartphone 200*a* and the tablet PC 200*b* receives and recognizes state information of another device. Hence, since each of the smartphone 200*a* and the tablet PC 200*b* recognizes a device existing nearby, it is able to execute a prescribed command included in the related command set in consideration of the nearby device.

For instance, it is able to execute a subcommand in consideration of a property of an external device of each terminal device. State information of each terminal device may include unique identification information of the corresponding terminal device. The unique identification information may further include additional information such as a size of a display unit and the like. The tablet PC 200*b* includes the Channel-A schedule table search command and a subcommand of the remote controller execution command and is able to recognize that the smartphone 200*a* exists nearby based on the state information. The table PC 200*c* can determine the Channel-A schedule table search command as executed in the terminal device having a wider display unit and is able to recognize that the tablet PC 200*b* has the display unit wider than that of the smartphone 200*a* based on the unique identification information. Hence, the tablet PC 200*b* can execute the Channel-A schedule table search command. And, the smartphone 200*a* can execute the remote controller execution command.

In consideration of a priority of a user command and a priority of a related command set, each terminal device can execute a subcommand. For instance, assume that a priority of the Channel-A schedule table search command is higher than that of the remote controller execution command in the related command set. And, assume that the tablet PC 200*b* has a second highest priority in association with a user's direct command. In this case, the tablet PC 200*b* executes the Channel-A schedule table search command and the smartphone 200*a* can execute the remote controller execution command.

Various methods mentioned in the foregoing description are identically applicable to the embodiments mentioned in the following description.

FIGS. 18A-19C are diagrams to describe a 2nd embodiment for a plurality of terminal devices to execute a user's command jointly.

Figure 18A:
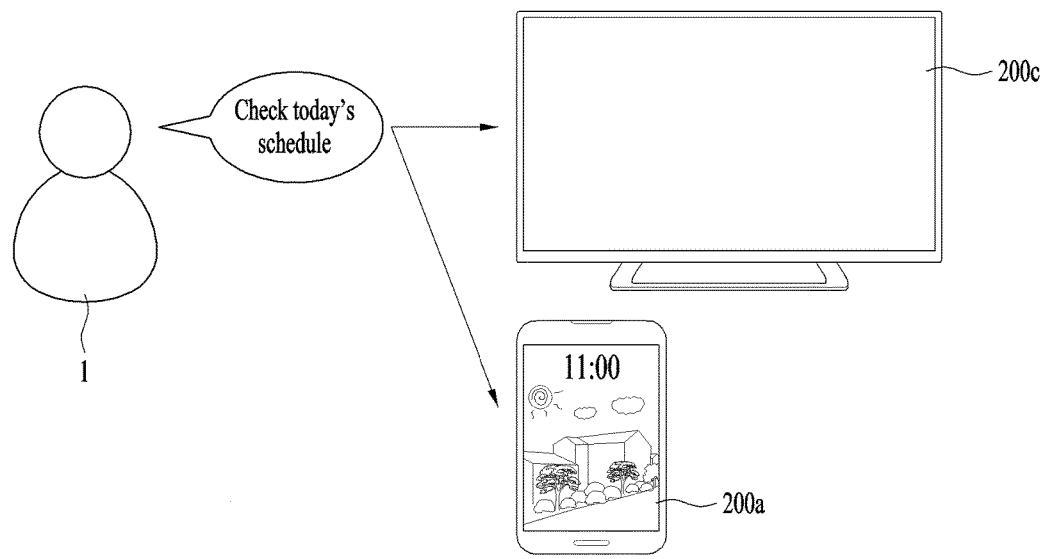
FIGS. 18A, 18B and 18C are diagrams to describe a 2nd embodiment for a plurality of terminal devices to execute a user's command jointly.

Referring to FIG. 18A, a smartphone 200*a* and a TV 200*c* are illustrated. A user 1 can give a command 'Check today's schedule'. The command 'Check today's schedule' can be recognized as a schedule check command. And, an associated command set of the schedule check command may include a place related information output command or a time related information output command. The place related information output command may include an output of information on a path from a current place to an appointment place, an output of information on a restaurant around an appointment place, and the like. The time related information output command may include an appointment time output, a weather information output and the like.

Each of the smartphone 200*a* and the TV 200*c* recognizes a user's command and is able to output state information. Each of the smartphone 200*a* and the TV 200*c* can receive state information of another external device. Each terminal device compares data included in the state information. And, a single terminal device can execute a user's direct command.

Figure 18B:
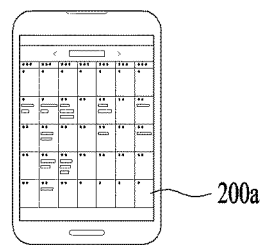

Referring to FIG. 18B, a smartphone 200*a* configured to execute a user's direct command is illustrated. A command priority of the smartphone 200*a* may be higher than that of the TV 200*c*. Hence, the smartphone 200*a* can execute the user's direct command. The smartphone 200*a* can display a user's schedule information by launching a calendar application. The smartphone 200*a* executing the user's direct command can transmit an execution request signal of an associated command related to the user's direct command.

Figure 18C:
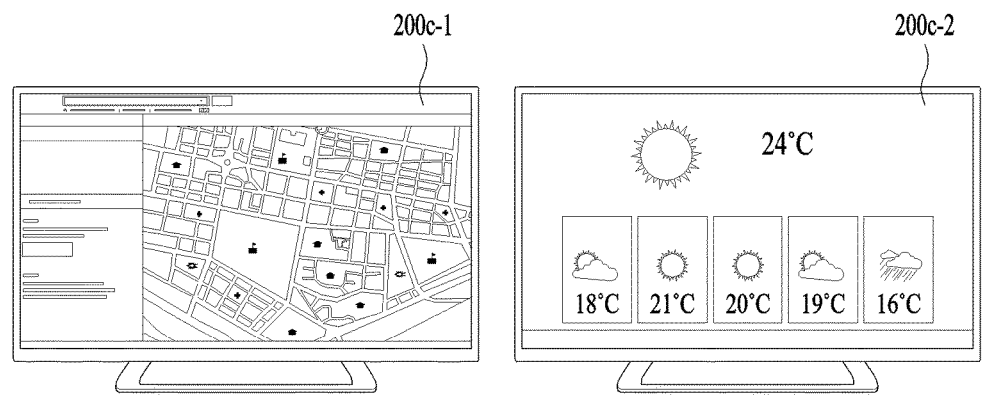

Referring to FIG. 18C, the TV 200*c* configured to execute an associated command is illustrated. According to one embodiment, the smartphone 200*a* can transmit a place related information output command or a time related information output command together with an additional information. If the additional information related to a user's schedule contains place information, the smartphone 200*a* can transmit the place related information output command. If the additional information related to the user's schedule contains time information, the smartphone 200a can transmit the time related information output command. If there exists at least three terminal devices, each of the terminal devices can determine a priority of a command included in a command set by transmitting state information of its own and receiving state information. Yet, when two terminal devices exist, if one of the two terminal devices executes a user's direct command, the other can execute an associated command of a user command without transmitting state information.

For instance, a TV 200c-1 can receive a place related information output command together with additional information of a place from the smartphone 200a. The TV 200c-1 can output a path from a current place to an appointment place, a map of an area around an appointment place, information on a restaurant around an appointment place and the like. For another instance, a TV 200c-2 can receive a time related information output command together with additional time information from the smartphone 200a. The TV 200c-2 can output weather information and the like. The TV 200c-2 can receive place and additional time information together from the smartphone 200a. Hence, the TV 200c can output the place and time related information. For instance, the TV 200c can display a weather information of an appointment area together with the map of an area around an appoint place.

FIGS. 19A-19D are diagrams to describe a 3rd embodiment for a plurality of terminal devices to execute a user's command jointly.

Figure 19A:
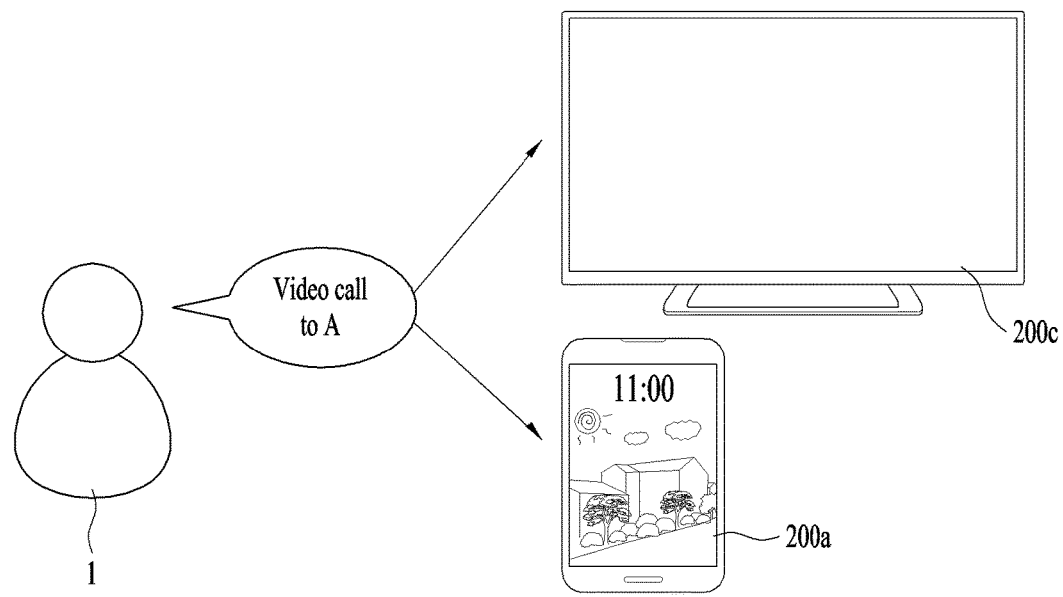
FIGS. 19A, 19B, 19C and 19D are diagrams to describe a 3rd embodiment for a plurality of terminal devices to execute a user's command jointly.

Referring to FIG. 19A, a smartphone 200a and a TV 200c are illustrated. A user 1 can give a command 'Video call to A'. The command 'Video call to A' can be recognized as a call command. And, an associated command set of the call command may include a content list output command. Each of the smartphone 200a and the TV 200c recognizes a user's command and is able to output state information. Each of the smartphone 200a and the TV 200c can receive state information of another external device. Each terminal device compares data included in the state information. And, a single terminal device can execute a user's direct command.

Figure 19B:
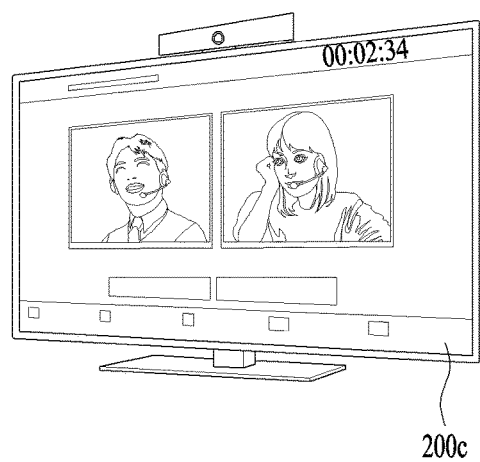

Referring to FIG. 19B, the TV 200c configured to execute a user's direct command is illustrated. For a video call command, a command priority of the TV 200c may be higher than that of the smartphone 200a. Hence, the TV 200c can execute the user's direct order. The TV 200c can transmit a content list output command to the smartphone 200a by broadcasting while launching a video call function.

Figure 19C:
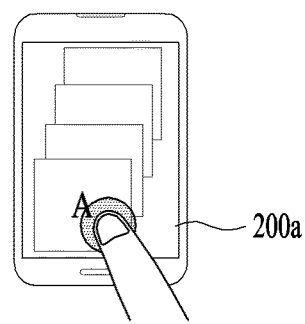

Referring to FIG. 19C, the smartphone 200a configured to execute an associated command is illustrated. According to one embodiment, the smartphone 200a receives a content list output command from the TV 200c and is able to output a content list. If there exist at least three terminal devices, the smartphone 200a transmits a state information related to the content list output command and receives state informations from other terminal devices, thereby being able to determine the priorities of the state informations. The smartphone 200a can receive an input of a command for selecting at least one content from the displayed content list from a user. For instance, the user can select content A from the smartphone 200a.

Figure 19D:
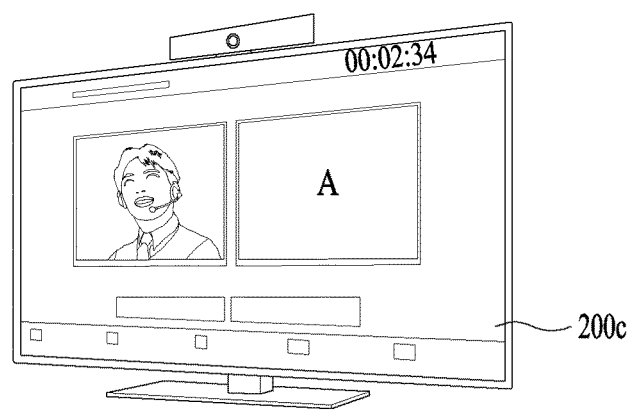

Referring to FIG. 19D, the TV 200c sharing contents of the smartphone 200a is illustrated. If the smartphone 200a receives a command for selecting the content A, the smartphone 200 can transmit the content A to the TV 200c. Subsequently, the TV 200c receives the content A and is then able to display the content A on a user's display region. Hence, a counterpart can watch the content A. In some cases, the TV 200c may transmit the content A received from the smartphone 200a to the counterpart.

Figure 20A:
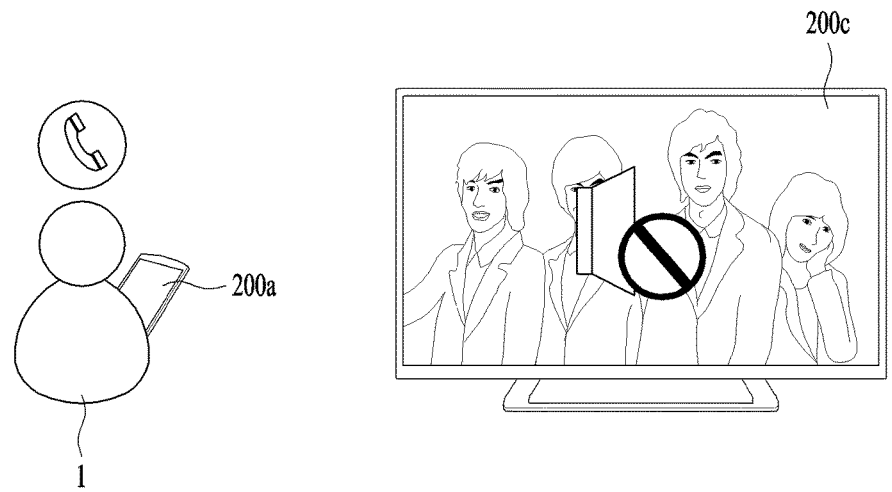
FIGS. 20A and 20B are diagrams to describe a 4th embodiment for a plurality of terminal devices to execute a user's command jointly.
Figure 20B:
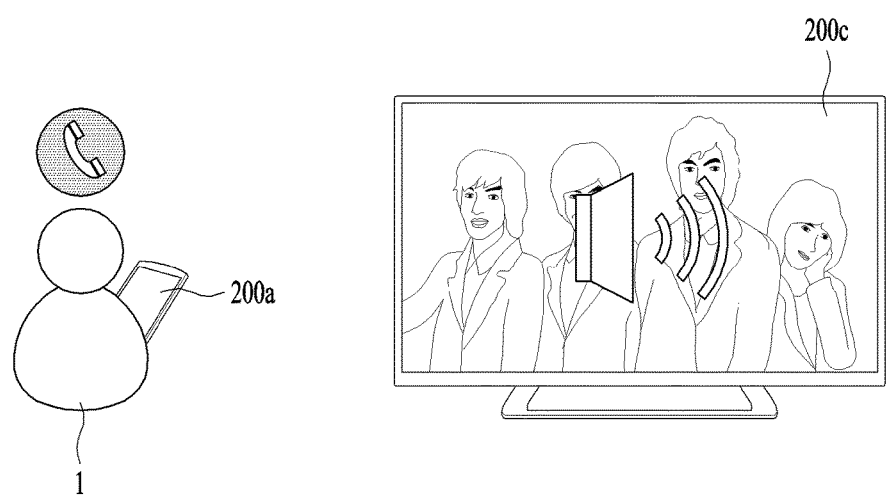

FIGS. 20A and 20B are diagrams to describe a 4th embodiment for a plurality of terminal devices to execute a user's command jointly.

Referring to FIG. 20A, a smartphone 200a and a TV 200c are illustrated. A user 1 can give a command 'Call to A'. The command 'Call to A' can be recognized as a call command. If a 1st terminal device makes a phone call, the 1st terminal device can have an absolute priority for sound.

Each of the smartphone 200a and the TV 200c receives an input of a user's command, outputs state information of its own, and is able to receive state information of another terminal device. For the call command, a state information priority of the smartphone 200a may be higher than that of the TV 200c. Hence, the smartphone 200a can execute the call command. Meanwhile, since the priority of the TV 200c for the call command is not higher than that of the smartphone 200a, the TV 200c may not execute the call command. Yet, the TV 200c may execute a mute mode as a command set of the call command. Since an associated command included in the command set is executed by a single terminal device, each terminal device can output state information related to the associated command again by broadcasting. Yet, the mute mode related to the call command is applicable to all terminal devices other than the signal terminal device that launches the call function. Hence, the TV 200c can execute the mute mode without sending state information separately.

Referring to FIG. 20B, the smartphone 200a and the TV 200c having ended a call are illustrated. While a user 1 is making a phone call, the smartphone 200a runs the call function and the TV 200c can execute the mute mode. If the call is ended, the smartphone 200a can transmit a call end signal by broadcasting. If the TV 200c receives the call end signal from the smartphone 200a, the TV 200c can output sound at an original volume.

The smartphone 200a and the TV 200c shown in FIG. 20 are active terminal devices, respectively. If a passive terminal device exists, it may not execute the mute mode. The passive terminal device is a device incapable of receiving an input of a user's command directly. Hence, since sound outputted from the passive terminal device is not heard by a user, it may not execute the mute mode. As mentioned in the foregoing description, a flag of state information is the value that indicates whether a user's command is inputted directly. Hence, a terminal device having a flag set to F (false) may not execute the mute mode.

Figure 21A:
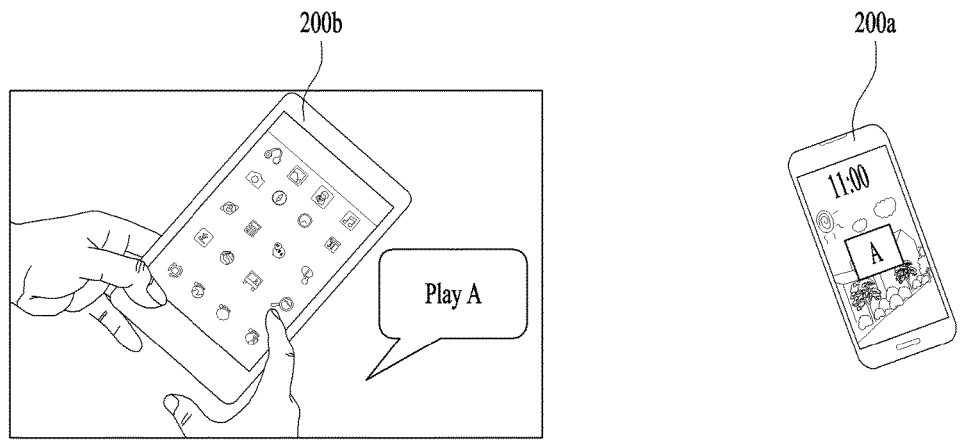
FIGS. 21A and 21B are diagrams to describe a 5th embodiment for a plurality of terminal devices to execute a user's command jointly.
Figure 21B:
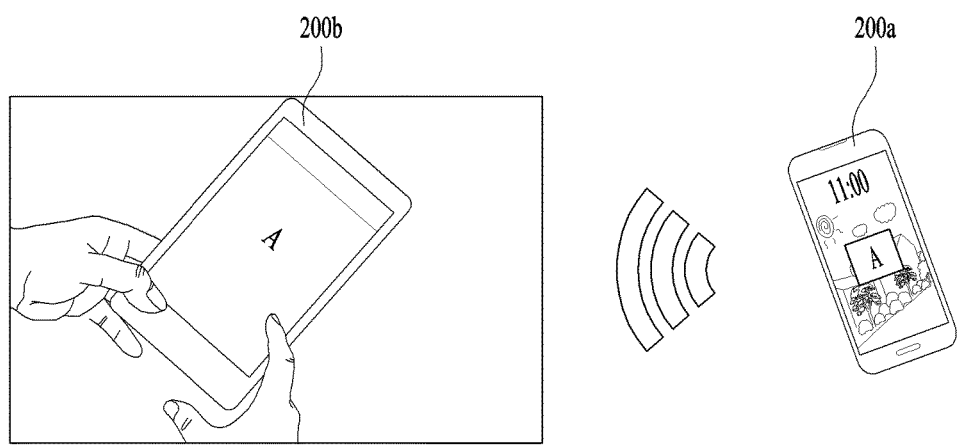

FIGS. 21A and 21B are diagrams to describe a 5th embodiment for a plurality of terminal devices to execute a user's command jointly.

Referring to FIG. 21A, a smartphone 200a and a tablet PC 200b are illustrated.

A user currently holds the tablet PC 200b and may put the smartphone 200a nearby. The user can give a command 'Play A'. The command 'Play A' can be recognized as a content play command. Each of the smartphone 200a and the tablet PC 200b receives an input of a user's command and is then able to recognize it as a content play command. Each of the smartphone 200a and the tablet PC 200b outputs state information of its own and is able to receive state information of another external device. If the smartphone 200a and the tablet PC 200b have the same command priority, the tablet PC 200b closer to a user than the smartphone 200a can execute the content play command. Yet, the content A fails to exist in the tablet PC 200b but may be saved in the smartphone 200a only.

Referring to FIG. 21B, the smartphone 200a configured to transmit a content to the tablet PC 200b is illustrated. Since the content A is saved in the smartphone 200a only, the smartphone 200a can transmit the content to the tablet PC 200b. The smartphone 200a may transmit streaming data to the tablet PC 200b by real time or may transmit the corresponding data to the tablet PC 200b by downloading.

A method of determining whether the content A exists in the tablet PC 200b is described as follows. First of all, the aforementioned state information may further include an additional field. For instance, in case of a command related to the content A, a field indicating a presence or non-presence of the content A may be included. Hence, the smartphone 200a can recognize that the content A does not exist in the tablet PC 200b. Moreover, the tablet PC 200b can recognize that the content A is saved in the smartphone 200a. The smartphone 200 can automatically transmit the content A to the tablet PC 200b.

A plurality of terminal devices may exist. And, the content A may exist in a plurality of the terminal devices. In this case, only a single terminal device having a priority among a plurality of the terminal devices currently storing the content A can transmit the content A to the tablet PC 200b. The content A can be transmitted to the tablet PC 200b in a manner that the content A is divided in accordance with the number of the terminal devices currently storing the content A and the priorities. For instance, assume that a size of the content A is 20 MB, that a 1st terminal device and a 2nd terminal device currently stores the content A, and that the 1st terminal device has a higher priority. The 1st terminal device having the higher priority transmits 0-10 MB of the content A to the tablet PC 200b and the 2nd terminal device having the lower priority can transmit 10-20 MB of the content A to the tablet PC 200b.

Figure 22A:
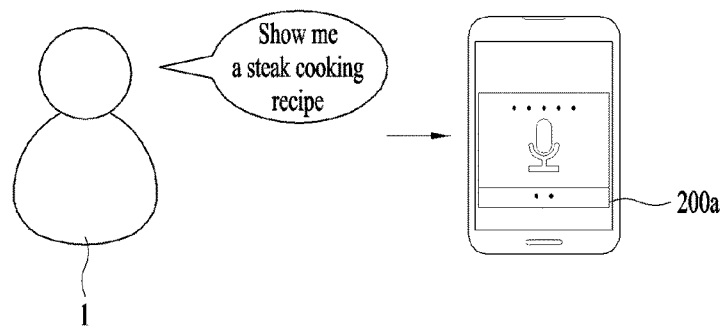
FIGS. 22A, 22B and 22C are diagrams to describe a 6th embodiment for a plurality of terminal devices to execute a user's command jointly.
Figure 22B:
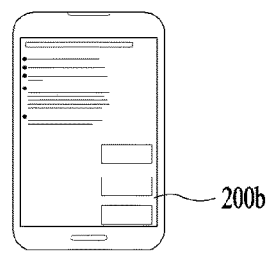
Figure 22C:
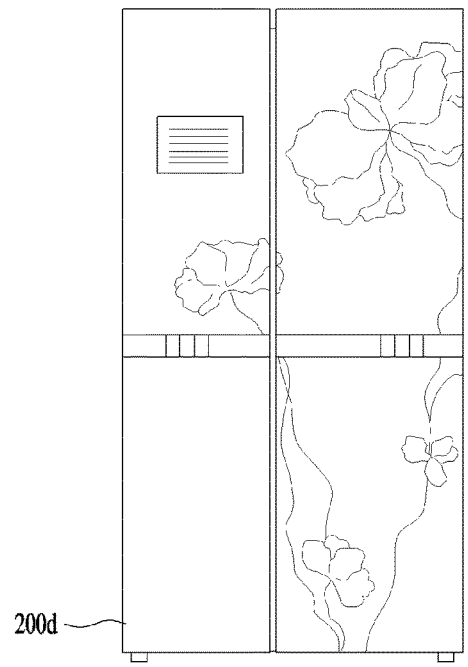

FIGS. 22A-22C are diagrams to describe a 6th embodiment for a plurality of terminal devices to execute a user's command jointly.

Referring to FIG. 22A, a user 1 and a smartphone 200a are illustrated. The user can give a command 'Show me a steak cooking recipe'. The smartphone 200a receives an input of a user's command and is then able to recognize it as a steak cooking recipe search command. Subsequently, the smartphone 200a searches for the steak cooking recipe and is then able to display the found steak cooking recipe. Since the command executing method is mentioned in the foregoing description, its details shall be omitted from the following description.

Referring to FIG. 22B, the smartphone 200a having found the cooking recipe is illustrated. The smartphone 200a searches for the recipe and is then able to broadcast an associated command related to the recipe. For instance, the associated command related to the recipe search command may include a command for checking whether a material list is retained and a command for ordering the required material.

Referring to FIG. 22C, a smart refrigerator 200d is illustrated. The smartphone 200a can broadcast state information on the associated command related to the recipe search command. A terminal device connected to the smartphone 200a through a short range communication network can receive the state information broadcasted by the smartphone 200a. Yet, a command for checking whether a material list is retained or a command for ordering the required material may be the command executed only by the smart refrigerator 200d. Hence, other terminal devices can ignore the state information transmitted by the smartphone 200a. The smart refrigerator 200d checks whether a steak material list is retained. If there are some materials in short, the smart refrigerator 200d can order the insufficient material. If there is insufficient material, the smart refrigerator 200d can guide a user of the insufficient material.

FIGS. 23A-23C are diagrams to describe a 7th embodiment for a plurality of terminal devices to execute a user's command jointly.

Referring to FIG. 23A, a user 1, a smartphone 200a and a smart air conditioner 200e are illustrated. A user can give a command let me know today's weather'. Each of the smart phone 200a and the smart air conditioner 200e receives an input of a user's command and is then able to recognize it as a weather search command. Each of the smart phone 200a and the smart air conditioner 200e outputs state information for the weather search command by broadcasting and is then able to receive the state information for the weather search command from an external device.

Referring to FIG. 23B, the smartphone 200a executing the weather search command is illustrated. The smartphone 200a may have a higher command priority for the weather search command. Hence, the smartphone 200a can display the found weather information. And, the smartphone 200a can transmit an associated command together with the weather information. The state information may additionally include an additional information field. The weather information can be transmitted in a manner of being contained in the additional information field of the state information. The smartphone 200a can broadcast the state information for the associated command. The smartphone 200a may broadcast the weather information only.

Referring to FIG. 23C, the smart air conditioner 200e executing a command is illustrated. If the smartphone 200a transmits state information including only weather information, state information for a weather associated command, or only weather information, only the smart air conditioner 200e can execute the command. As mentioned in the foregoing description, if a different terminal device receives a command or information not related to the different terminal device, it can ignore the received signal.

The smart air conditioner 200e can be programmed to perform a different operation in accordance with the weather information. For instance, if it is snowing or raining, the smart air conditioner 200e can run a dehumidifier function. If fine dust is excessively present in the air, the smart air conditioner 200e can run an air cleaner function. If it is dry, the smart air conditioner 200e can run a humidifier function.

So far, various embodiments of a plurality of terminal devices for efficiently executing a user's command are described. In the following description, a method of controlling a terminal device is described in detail with reference to FIG. 24.

FIG. 24 is a flowchart for a method of controlling a terminal device according to one embodiment of the present invention.

Referring to FIG. 24, a terminal device can receive an input of a command [S2410]. The terminal device can directly receive an input of a command from a user. A terminal device configured to directly receiving an input of a user's command is called an active terminal device or an active agent. Alternatively, the terminal device can receive an input of a user's command by receiving state information of another terminal device. The terminal device configured to indirectly receive an input of a user's command is called a passive terminal device or a passive agent.

The terminal device recognizes the inputted command and is able to detect state information [S2420]. In this case, the state information may include recognized command data, command priority data for a recognized command, command recognized time data, and the like. And, the state information can further include at least one of a command recognition flag indicating whether an input of a command is directly received, distance data indicating a distance from a user, and weight data indicating an additional weight. And, the state information may further include an additional information field that includes such additional information as information indicating whether a specific content is owned, weather information and the like.

The terminal device transmits the detected state information by broadcasting and is able to receive the external device's state information from the external device by broadcasting [S2430]. The terminal device compares the detected state information to the received state information of the external device. If a priority of the detected state information is higher, the terminal device can execute the recognized command. If a priority of the detected state information is lower, the terminal device may not execute the recognized command [S2440]. For instance, the terminal device may consider a command recognition flag in the state information in the first place. The terminal device can further consider a command priority and a distance after considering the flag. Moreover, the terminal device can consider a command priority resulting from adding a weight data to the command priority.

The methods described herein can be implemented in a program recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy discs, optical data storage devices, and the like for example and also include carrier-wave type implementations (e.g., transmission via Internet). Further, the computer may include a controller 180 of the terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A first terminal device, comprising:
   an input unit configured to receive commands;
   a communication unit configured to transmit and receive information; and
   a controller configured to:
   recognize a received command;
   determine state information of the first terminal device, the state information including information related to a priority for the recognized command and a command set related to the recognized command, the command set including a plurality of subcommands associated with the recognized command;
   control the communication unit to broadcast the determined state information;
   control the communication unit to receive state information of at least a second terminal device;
   compare the determined state information to the received state information;
   determine a priority of the first terminal device with regard to the recognized command based on a result of the comparison;
   execute the recognized command if the determined priority is higher than a determined priority of the at least the second terminal device with regard to the recognized command; and
   execute a subcommand of the plurality of subcommands based on a priority of each of the plurality of subcommands if the determined priority is not higher than the determined priority of the at least the second terminal device.

2. The terminal device of claim 1, wherein each of the determined state information and received state information comprises the recognized command and at least priority data related to the recognized command or time data related to the recognized command.

3. The terminal device of claim 2, wherein each of the determined state information and received state information further comprises at least an indication of whether the recognized command was received directly by the corresponding first terminal device or at the least the second terminal device, distance data indicating a distance of the corresponding first terminal device or the at least the second terminal device from a user that input the recognized command or additional information related to the determined priority of the corresponding first terminal device or the at least the second terminal device.

4. The terminal device of claim 3, wherein the controller is further configured to:
   determine that the recognized command is not executable in the first terminal device;
   control the communication unit to receive data related to the recognized command from the at least the second terminal device for which the recognized command is executable; and
   process the received data.

5. The terminal device of claim 3, wherein determining the priority of the first terminal device comprises comparing priority data included in the determined state information to priority data included in the received state information.

6. The terminal device of claim 5, wherein determining the priority of the first terminal device further comprises:
   altering at least the priority data included in the determined state information or the priority data included in the received state information according to the corresponding additional information; and
   performing the comparison by using the altered priority data.

7. The terminal device of claim 5, wherein determining the priority of the first terminal device further comprises comparing the distance data included in the determined state information to the distance data included in the received state information.

8. The terminal device of claim 1, wherein the controller is further configured to control the communication unit to broadcast the command set to the at least the second terminal device.

9. The terminal device of claim 8, wherein the controller is further configured to:
   control the communication unit to receive a command set of the at least the second terminal device; and
   execute at least one executable subcommand included in the received command set.

10. A system for controlling terminal devices, the system, comprising;
    a first terminal device configured to:
    recognize a received command;
    determine first state information of the first terminal device; and broadcast the determined first state information; and
a second terminal device configured to:
  recognize the received command;
  determine second state information of the second terminal device; and
  broadcast the determined second state information,
wherein each of the first state information and second state information includes information related to a priority for the recognized command and a command set related to the recognized command,
wherein the command set includes a plurality of subcommands associated with the recognized command, and
wherein each of the first terminal device and second terminal device is further configured to:
  receive the first or second state information broadcast by the other of the first terminal device and second terminal device;
  compare its own determined first or second state information to the received first or second state information;
  determine its own priority with regard to the recognized command based on a result of the comparison;
  execute the recognized command if its own determined priority is higher than a determined priority of the other of the first terminal device and second terminal device with regard to the recognized command; and
  execute a subcommand of the plurality of subcommands based on a priority of each of the plurality of subcommands if its own determined priority is not higher than the determined priority of the other of the first terminal device and second terminal device.

11. The system of claim 10, wherein:
each of the determined first state information and determined second state information comprises the recognized command and at least priority data related to the recognized command or time data related to the recognized command; and
each of the first terminal device and second terminal device is further configured to determine its own priority by comparing priority data included in the corresponding determined first or second state information to priority data included in the corresponding received first or second state information.

12. The network system of claim 11, wherein:
each of the determined first state information and determined second state information further comprises at least an indication of whether the recognized command was received directly by the corresponding first or second terminal device, distance data indicating a distance of the corresponding first or second terminal device from a user that input the recognized command or additional information related to the determined priority of the corresponding first or second terminal device; and
each of the first terminal device and second terminal device is further configured to alter at least the priority data included in the corresponding determined first or second state information and perform the comparison by using the altered priority data.

13. A method of controlling a first terminal device, the method comprising:
recognizing a received command;
determining state information of the first terminal device, the state information including information related to a priority for the recognized command and a command set related to the recognized command, the command set including a plurality of subcommands associated with the recognized command;
broadcasting the detected state information;
receiving state information of at least a second terminal device;
comparing the determined state information to the received state information;
determining a priority of the first terminal device with regard to the recognized command based on a result of the comparison;
executing the recognized command if the determined priority is higher than a determined priority of the at least the second terminal device with regard to the recognized command; and
execute a subcommand of the plurality of subcommands based on a priority of each of the plurality of subcommands if the determined priority is not higher than the determined priority of the at least the second terminal device.

14. The method of claim 13, wherein each of the determined state information and received state information comprises the recognized command and at least priority data related to the recognized command or time data related to the recognized command.

15. The method of claim 14, wherein each of the determined state information and received state information further comprises at least an indication of whether the recognized command was received directly by the corresponding first terminal device or the at least the second terminal device, distance data indicating a distance of the corresponding first terminal device or the at least the second terminal device from a user that input the recognized command or additional information related to the determined priority of the corresponding first terminal device or the at least the second terminal device.

16. The method of claim 15, further comprising:
determining that the recognized command is not executable in the first terminal device;
receiving data related to the recognized command from the at least the second terminal device for which the recognized command is executable; and
processing the received data.

17. The method of claim 15, wherein determining the priority of the first terminal device further comprises:
altering at least the priority data included in the determined state information or the priority data included in the received state information according to the corresponding additional information; and
performing the comparison by using the altered priority data.

18. The method of claim 15, wherein determining the priority of the first terminal device further comprises comparing the distance data included in the determined state information to the distance data included in the received state information.

19. The method of claim 13, wherein further comprising broadcasting the command set to the at least the second terminal device.

20. The method of claim 19, further comprising:
receiving a command set of at least the second terminal device; and
executing at least one executable subcommand included in the received command set.

* * * * *